US012812435B2

(12) United States Patent
Shi

(10) Patent No.: US 12,812,435 B2
(45) Date of Patent: Nov. 24, 2026

(54) MEASUREMENT RELAXATION INDICATION METHOD AND APPARATUS, AND USER EQUIPMENT, BASE STATION AND STORAGE MEDIUM STORAGE MEDIUM

(71) Applicant: Beijing Xiaomi Mobile Software Co., Ltd., Beijing (CN)

(72) Inventor: Rao Shi, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 369 days.

(21) Appl. No.: 18/577,311

(22) PCT Filed: Jul. 8, 2021

(86) PCT No.: PCT/CN2021/105345
§ 371 (c)(1),
(2) Date: Jan. 8, 2024

(87) PCT Pub. No.: WO2023/279351
PCT Pub. Date: Jan. 12, 2023

(65) Prior Publication Data

US 2024/0381149 A1 Nov. 14, 2024

(51) Int. Cl.
*H04W 24/10* (2009.01)
*H04W 56/00* (2009.01)
*H04W 76/20* (2018.01)

(52) U.S. Cl.
CPC ....... *H04W 24/10* (2013.01); *H04W 56/0015* (2013.01); *H04W 76/20* (2018.02)

(58) Field of Classification Search
CPC ..... H04W 24/10; H04W 24/02; H04W 24/08; H04W 76/20; H04W 76/27; H04W 36/00; H04W 56/0015
USPC .......................................................... 370/329
See application file for complete search history.

(56) References Cited

U.S. PATENT DOCUMENTS

| | | | | |
|---|---|---|---|---|
| 2020/0314868 | A1* | 10/2020 | Tseng | H04B 17/318 |
| 2022/0116802 | A1* | 4/2022 | Kim | H04W 76/27 |
| 2022/0174608 | A1* | 6/2022 | Laselva | H04W 24/08 |
| 2022/0377635 | A1* | 11/2022 | Hviid | H04W 24/08 |
| 2023/0269614 | A1* | 8/2023 | Chen | H04W 24/08 370/252 |

(Continued)

FOREIGN PATENT DOCUMENTS

CN 111800800 A 10/2020

OTHER PUBLICATIONS

International Search Report and Written Opinion of International Application No. PCT/CN2021/105345, dated Apr. 8, 2022, 12 pages.

(Continued)

*Primary Examiner* — Jungwon Chang
(74) *Attorney, Agent, or Firm* — Finnegan, Henderson, Farabow, Garrett & Dunner, L.L.P.

(57) ABSTRACT

A measurement relaxation instruction method is performed by a user equipment (UE), and includes: obtaining at least one of relaxation instruction information or relaxation measurement configuration information sent by a base station; and switching from a normal measurement state to a measurement relaxation state based on the at least one of the relaxation instruction information or the relaxation measurement configuration information sent by the base station.

20 Claims, 11 Drawing Sheets

(56) References Cited

U.S. PATENT DOCUMENTS

| | | | | |
|---|---|---|---|---|
| 2024/0179546 | A1* | 5/2024 | Hu | H04W 24/08 |
| 2024/0214853 | A1* | 6/2024 | Dimnik | H04W 24/10 |
| 2025/0081225 | A1* | 3/2025 | Chen | H04W 24/02 |

OTHER PUBLICATIONS

Vivo, Guangdong Genius, RRM Relaxation for Neighboring Cells in Connected State, 3GPP TSG-RAN WG2 Meeting #114-e, R2-2104913, e-Meeting, May 19-27, 2021, 4 pages.

* cited by examiner

MEASUREMENT RELAXATION INDICATION METHOD AND APPARATUS, AND USER EQUIPMENT, BASE STATION AND STORAGE MEDIUM STORAGE MEDIUM

CROSS-REFERENCE TO RELATED APPLICATION

This application is a U.S. national phase application of International Application No. PCT/CN2021/105345, filed on Jul. 8, 2021, the content of which is hereby incorporated by reference in its entirety.

TECHNICAL FIELD

The disclosure relates to a field of communication technologies, and more particularly to a measurement relaxation instruction method and apparatus, a user equipment, a base station, and a storage medium.

BACKGROUND

In a communication system, when a user equipment (UE) satisfies measurement relaxation criteria (such as a low mobility criterion, a non-cell edge criterion, and a stationary criterion, etc.), the UE will be switched to a measurement relaxation state to reduce a power consumption of the UE.

However, in the related art, a measurement relaxation switch mechanism is introduced only for a UE in an idle state and a UE in an inactive state, and how to instruct a UE in a connected state to perform measurement relaxation has not yet been determined. Therefore, there is an urgent need for a measurement relaxation instruction method applied to the UE in the connected state.

SUMMARY

A measurement relaxation instruction method proposed in an aspect of the embodiments of the present disclosure the embodiment is applied to a UE, and includes:

- obtaining relaxation instruction information and/or relaxation measurement configuration information sent by a base station; and
- switching from a normal measurement state to a measurement relaxation state based on information sent by the base station.

A measurement relaxation instruction method proposed in another aspect of the embodiments of the present disclosure is applied to a base station, and includes:

- sending relaxation instruction information and/or relaxation measurement configuration information to a UE in a connected state.

A user equipment proposed in yet another aspect of the embodiments of the present disclosure includes: a transceiver; a memory; and a processor, respectively connected to the transceiver and the memory, and configured to control the transceiver to send and receive wireless signals, and perform the method proposed in the above aspect of the embodiments by executing computer-executable instructions on the memory.

Abase station proposed in yet another aspect of the embodiments of the present disclosure includes: a transceiver; a memory; and a processor, respectively connected to the transceiver and the memory, and configured to control the transceiver to send and receive wireless signals, and perform the method proposed in the above another aspect of the embodiments by executing computer-executable instructions on the memory.

A computer storage medium proposed in yet another aspect of the embodiments of the present disclosure has computer-executable instructions stored thereon. After the computer-executable instructions are executed by a processor, the method as described above is implemented.

BRIEF DESCRIPTION OF THE DRAWINGS

The above and/or additional aspects and advantages of the disclosure will be apparent and more readily appreciated from the following descriptions made with reference to accompanying drawings, in which.

DETAILED DESCRIPTION

Figure 1:
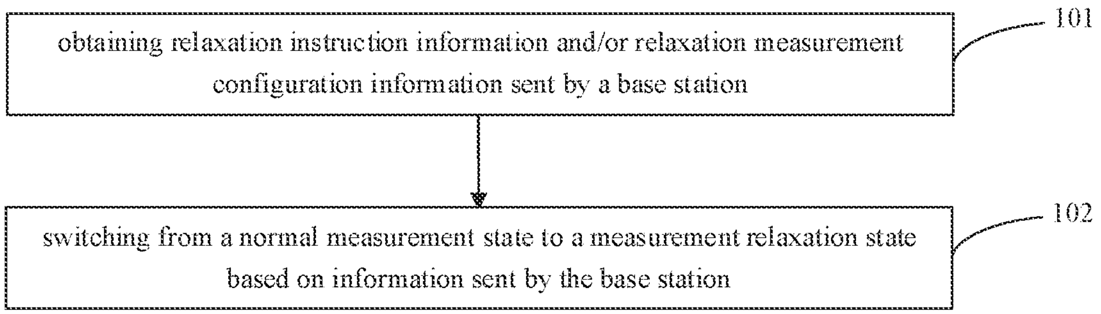
FIG. 1 is a flowchart illustrating a measurement relaxation instruction method according to an embodiment of the present disclosure.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

The terms used in the disclosure are only for the purpose of describing specific embodiments, and are not intended to limit the disclosure. The singular forms of “a” and “the” used in the disclosure and appended claims are also intended to include plural forms, unless the context clearly indicates other meanings. It should also be understood that the term “and/or” as used herein refers to and includes any or all possible combinations of one or more associated listed items.

It should be understood that although the terms “first”, “second”, and “third” may be used in this disclosure to describe various information, the information should not be limited to these terms. These terms are only used to distinguish the same type of information from each other. For example, without departing from the scope of the disclosure, the first information may also be referred to as the second information, and similarly, the second information may also be referred to as the first information. Depending on the context, the term “if” as used herein can be interpreted as “when”, “while” or “in response to determining”.

Description will be made in detail below to embodiments of the disclosure. Examples of embodiments are illustrated in the accompanying drawings, in which the same or similar numerals represent the same or similar elements throughout. Embodiments described below with reference to the accompanying drawings are exemplary, which are intended to explain the disclosure and do not be understood a limitation of the disclosure.

In the measurement relaxation instruction method provided in the embodiments of the present disclosure, the UE in the connected state can obtain the relaxation instruction information and/or the relaxation measurement configuration information sent by the base station, and switch from the normal measurement state to the measurement relaxation state based on the information sent by the base station. Therefore, the embodiments of the present disclosure propose a measurement relaxation instruction method applied to a UE in a connected state, so that the UE in the connected state can switch between the normal measurement state and the measurement relaxation state, thus ensuring performance of the UE and reducing a power consumption.

The measurement relaxation instruction method and apparatus, the user equipment, the base station, and the storage medium provided by the present disclosure will be described in detail below with reference to the accompanying drawings.

FIG. 1 is a flowchart illustrating a measurement relaxation instruction method according to an embodiment of the present disclosure. The measurement relaxation instruction method is applied to a UE. As shown in FIG. 1, the measurement relaxation instruction method may include the following steps.

Step 101, relaxation instruction information and/or relaxation measurement configuration information sent by a base station is obtained.

It should be noted that the instruction method in the embodiment of the present disclosure may be applied to any UE. The UE may be a device providing voice and/or data connectivity for a user. The UE may communicate with one or more core networks via a radio access network (RAN). The UE may be an Internet of Things terminal, such as, a sensor device, a mobile phone (or a “cellular” phone), or a computer with the Internet of Things terminal. The UE may be a fixed, portable, pocket-sized, handheld, computer-built or vehicle-mounted device, such as, a station (STA), a subscriber unit, a subscriber station, a mobile station, a mobile, a remote station, an access point, a remote terminal, an access terminal, a user terminal, or a user agent. Alternatively, the UE may be an unmanned aerial vehicle. Alternatively, the UE may be a vehicle-mounted/on-board device, such as, a driving computer with a wireless communication function, or a wireless communication device with an external driving computer. Alternatively, the UE may be a roadside device, such as a street lamp, a signal lamp, or other roadside devices with the wireless communication function.

In an embodiment of the present disclosure, the measurement relaxation instruction method is specifically applied to a UE in a connected state.

In an embodiment of the present disclosure, the above relaxation instruction information is specifically configured to instruct the UE in the connected state to switch to the measurement relaxation state. The above relaxation measurement configuration information is specifically configured to perform measurement relaxation.

Further, in an embodiment of the present disclosure, the specific method for the UE to obtain the relaxation instruction information and/or the relaxation measurement configuration information sent by the base station may include: obtaining the relaxation instruction information and/or the relaxation measurement configuration information sent by the base station through a down link dedicated control channel (DL-DCCH). Specifically, in an embodiment of the present disclosure, the UE may obtain the relaxation instruction information and/or the relaxation measurement configuration information sent by the base station through a radio resource control (RRC) message. For example, the UE may obtain the relaxation instruction information sent by the base station through an RRC reconfiguration (Reconfiguration) message or an RRC connection resume (Resume) message or an RRC connection establishment (Set Up) message, and obtain the relaxation measurement configuration information sent by the base station through the RRC Reconfiguration message or the RRC Resume message.

In an embodiment of the present disclosure, the UE may only obtain the relaxation instruction information sent by the base station. In another embodiment of the present disclosure, the UE may only obtain the relaxation measurement configuration information sent by the base station. In yet another embodiment of the present disclosure, the UE may obtain relaxation instruction information and relaxation measurement configuration information sent by the base station.

Step 102, it is switched from a normal measurement state to a measurement relaxation state based on information sent by the base station.

In an embodiment of the present disclosure, the above-mentioned normal measurement state and measurement relaxation state are both used to perform measurement on radio resource management (RRM), and mainly perform measurement on RRM of a neighboring cell.

To sum up, in the measurement relaxation instruction method provided by the embodiment of the present disclosure, the UE in the connected state can obtain the relaxation instruction information and/or the relaxation measurement configuration information sent by the base station, and switch from the normal measurement state to the measurement relaxation state based on the information sent by the base station. Therefore, the embodiment of the present disclosure proposes a measurement relaxation instruction method applied to a UE in a connected state, so that the UE in the connected state can switch between the normal measurement state and the measurement relaxation state, thus ensuring performance of the UE and reducing a power consumption.

Figure 2:
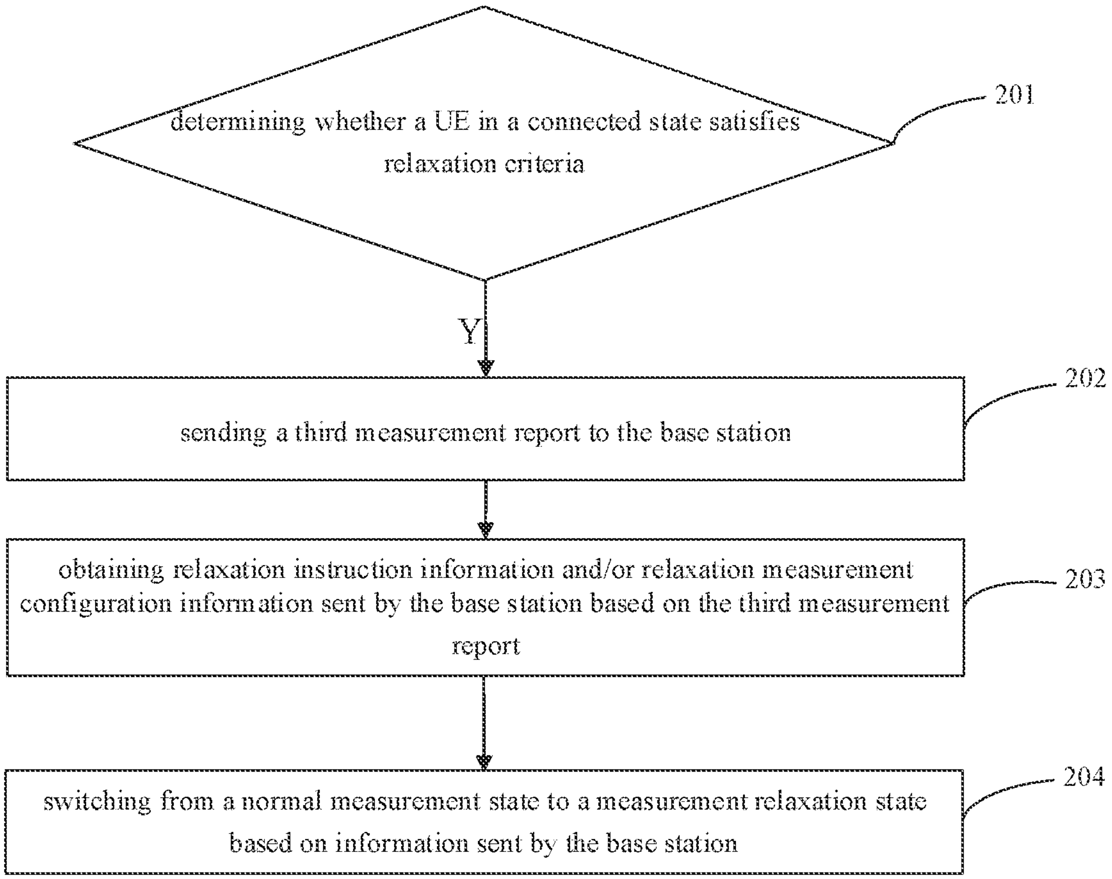
FIG. 2 is a flowchart illustrating a measurement relaxation instruction method according to another embodiment of the present disclosure.

FIG. 2 is a flowchart illustrating a measurement relaxation instruction method according to another embodiment of the present disclosure, which is applied to a UE. As shown in FIG. 2, the measurement relaxation instruction method may include the following steps.

Step 201, it is determined whether a UE in a connected state satisfies relaxation criteria.

In an embodiment of the present disclosure, the relaxation criteria may include a low mobility criterion, a non-cell edge criterion, and a stationary criterion.

In an embodiment of the present disclosure, the method for determining whether the UE in the connected state satisfies the low mobility criterion may include: determining whether an absolute value of a difference between a preset reference value $s_{rxlev_{Ref}}$ (in dB) of a received signal strength of a current serving cell and an actual received signal strength $s_{rxdev}$ (in dB) of the UE in the current serving cell is less than a first preset threshold $s_{searchDeltaP}$ within a first preset time period, if $|s_{rxlev_{Ref}}-s_{rxlev}|$ is always less than $s_{searchDeltaP}$ within the first preset time period, considering that a current signal amplitude of the UE does not change much (that is, it can be approximately considered that the UE is in a low mobility state), and determining that the UE meets the low mobility criterion; otherwise, determining that the UE does not satisfy the low mobility criterion.

In an embodiment of the present disclosure, the method for determining whether the UE in the connected state satisfies the non-cell edge criterion may include: determining whether $s_{rxlev}$ of the UE in the current serving cell is greater than a second preset threshold $s_{searchThresholdP}$, and determining whether an actual received signal quality $s_{qual}$ of the UE in the current serving cell is greater than a third preset threshold $s_{searchThresholdQ}$; if $s_{rxlev}>s_{searchThresholdP}$ and $s_{qual}>s_{searchThresholdQ}$, considering that the UE is not at an edge of the cell and determining that the UE meets the non-cell edge criterion; otherwise, determining that the UE does not satisfy the non-cell edge criterion.

In an embodiment of the present disclosure, the method for determining whether the UE in the connected state satisfies the stationary criterion may include: determining whether $|s_{rxlev_{Ref}}-s_{rxlev}|$ corresponding to the UE in the connected state is less than a fourth preset threshold within a second preset time period and whether the number of times of beam switching of the UE is less than a fifth preset threshold, if $|s_{rxlev_{Ref}}-s_{rxlev}|$ is always less than the fourth threshold within the second preset time period and the number of times of beam switching of the UE is less than the fifth threshold, considering that the UE signal amplitude does not change much, and that the number of times of beam switching is small (that is, the UE can be approximately considered to be in a stationary state), and determining that the UE meets the stationary criterion; otherwise, determining that the UE does not meet the stationary criterion.

It should be noted that, in an embodiment of the present disclosure, the first preset time period, the second preset time period, and the first to fifth preset thresholds described above may be provided by the base station. The above determination criteria (for example, determining whether the UE meets the low mobility criterion by determining whether $|s_{rxlev_{Ref}}-s_{rxlev}|$ is less than $s_{searchDeltaP}$) may be stipulated by the protocol.

Further, in an embodiment of the present disclosure, the first preset time period and the second preset time period described above may be the same or different; and the first preset threshold and the fourth preset threshold described above may be the same or different.

In addition, it should be noted that, in an embodiment of the present disclosure, if the UE in the connected state satisfies any criterion in the relaxation criteria, it is considered that the UE in the connected state satisfies the relaxation criteria. In another embodiment of the present disclosure, if the UE in the connected state satisfies any combination of criterions in the relaxation criteria, it is considered that the UE in the connected state satisfies the relaxation criteria.

When the UE in the connected state satisfies the relaxation criteria, step 202 is executed.

Step 202, a third measurement report is sent to the base station.

In an embodiment of the present disclosure, when the UE in the connected state satisfies the relaxation criteria, it can be considered that the UE in the connected state is unlikely to need to switch the cell, so that the UE in the connected state can be allowed to perform a certain degree of measurement relaxation, the UE in the connected state may send the third measurement report to the base station to request the measurement relaxation. The third measurement report may be configured to indicate that the UE meets the relaxation criteria, specifically, it may be configured to indicate that the UE meets the low mobility criterion, or meets the non-cell edge criterion, or meets the stationary criterion.

In an embodiment of the present disclosure, the method for the UE in the connected state to send the third measurement report to the base station may specifically include: sending the third measurement report to the base station through an uplink dedicated control channel (UL-DCCH). Exemplarily, in an embodiment of the present disclosure, the UE may send the third measurement report to the base station through an RRC message (such as a measurement report message).

Step 203, relaxation instruction information and/or relaxation measurement configuration information sent by the base station based on the third measurement report is obtained.

Step 204, it is switched from a normal measurement state to a measurement relaxation state based on information sent by the base station.

For detailed introduction of steps 203-204, reference may be made to the relevant introduction in the foregoing embodiments, which is not elaborated in the embodiment of the present disclosure.

To sum up, in the measurement relaxation instruction method provided by the embodiment of the present disclosure, the UE in the connected state can obtain the relaxation instruction information and/or the relaxation measurement configuration information sent by the base station, and switch from the normal measurement state to the measurement relaxation state based on the information sent by the base station. Therefore, the embodiment of the present disclosure proposes a measurement relaxation instruction method applied to a UE in a connected state, so that the UE in the connected state can switch between the normal measurement state and the measurement relaxation state, thus ensuring performance of the UE and reducing a power consumption. Moreover, in the embodiment of the present disclosure, the UE sends a request to the base station to switch to the measurement relaxation state after determining that it satisfies the relaxation criteria, so as to ensure that every time the UE in the connected state switches to the measurement relaxation state when necessary, thus ensuring a switching accuracy.

Figure 3:
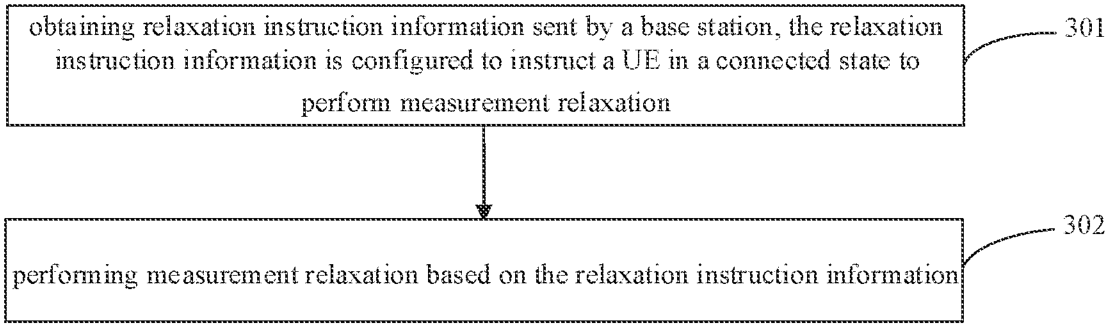
FIG. 3 is a flowchart illustrating a measurement relaxation instruction method according to another embodiment of the present disclosure.

FIG. 3 is a flowchart illustrating a measurement relaxation instruction method according to another embodiment of the present disclosure, which is applied to a UE. As shown in FIG. 3, the measurement relaxation instruction method may include the following steps.

Step 301, relaxation instruction information sent by a base station is obtained. The relaxation instruction information is configured to instruct a UE in a connected state to perform measurement relaxation.

Alternatively, in an embodiment of the present disclosure, the UE may first determine whether the UE in the connected state satisfies relaxation criteria, and the relaxation criteria include at least one of a low mobility criterion, a non-cell edge criterion, and a stationary criterion. When the UE in the connected state satisfies the relaxation criteria, the UE may send a third measurement report to the base station, and receive the relaxation instruction information sent by the base station based on the third measurement report.

In an embodiment of the present disclosure, the specific method for the UE to obtain the relaxation instruction information sent by the base station may include: obtaining the relaxation instruction information sent by the base station through a DL-DCCH. Exemplarily, in an embodiment of the present disclosure, the UE may obtain the relaxation instruction information sent by the base station through an RRC message (such as an RRC Reconfiguration message or an RRC Resume message or an RRC Set Up message).

In an embodiment of the present disclosure, the relaxation instruction information may include a predefined measurement relaxation parameter, and then subsequently the UE may perform measurement relaxation based on the predefined measurement relaxation parameter. In another embodiment of the present disclosure, the relaxation instruction information may not include the predefined measurement relaxation parameter. In this case, the UE may subsequently obtain the predefined measurement relaxation parameter indicated by the base station to perform the measurement relaxation based on the measurement relaxation parameter.

In an embodiment of the present disclosure, the predefined measurement relaxation parameter may specifically include at least one of the following:

- a measurement suspending duration;
- an expansion factor of a measurement period, in which the expansion factor of the measurement period is configured to lengthen a measurement period in the normal measurement state;
- one or more dedicated measurement frequencies (i.e., measurement frequency band), in which a number of the one or more dedicated measurement frequencies is less than a number of measurement frequencies in the normal measurement state;
- a predefined synchronization signal block measurement timing configuration (SMTC), in which a period of the predefined SMTC is less than a period of an SMTC in the normal measurement state;
- a predefined SMTC, in which a window length of the predefined SMTC is smaller than a window length of an SMTC in the normal measurement state;
- a predefined synchronization signal block measurement (SSB-ToMeasure) parameter, in which a number of measurement beams corresponding to the predefined SSB-ToMeasure parameter is less than a number of measurement beams corresponding to an SSB-ToMeasure parameter in the normal measurement state; or
- one or more predefined types of one or more pilot signals to be measured, in which a number of the one or more predefined types of one or more pilot signals to be measured is less than a number of types of pilot signals to be measured in the normal measurement state.

In an embodiment of the present disclosure, the measurement relaxation parameter may be only any one of the above parameters. In another embodiment of the present disclosure, the measurement relaxation parameter may be any combination of the above parameters.

Step 302, measurement relaxation is performed based on the relaxation instruction information.

In an embodiment of the present disclosure, if the relaxation instruction information in step 301 includes the predefined measurement relaxation parameter, then in this step, the UE may directly perform the measurement relaxation based on the predefined measurement relaxation parameter carried in the relaxation instruction information.

In another embodiment of the present disclosure, if the relaxation instruction information in step 301 does not include the predefined measurement relaxation parameter, then in this step, the UE may obtain the predefined measurement relaxation parameter indicated by the base station after obtaining the relaxation instruction information.

In an embodiment of the present disclosure, the method for the UE to obtain the predefined measurement relaxation parameter indicated by the base station may include at least one of the following.

First method, the predefined measurement relaxation parameter sent by the base station is obtained through a system message. For example, in an embodiment of the present disclosure, the predefined measurement relaxation parameter broadcast by the base station through a system information block (SIB) X may be obtained, where X may be any SIB.

Second method, the predefined measurement relaxation parameter indicated by the base station is obtained based on a protocol. For example, in an embodiment of the present disclosure, the predefined measurement relaxation parameter indicated by the base station based on the TS38.331 protocol may be obtained.

Third method, the predefined measurement relaxation parameter sent by the base station through an RRC message is obtained. For example, in an embodiment of the present disclosure, the predefined measurement relaxation parameter sent by the base station to the UE through an RRC Reconfiguration message, an RRC Resume message, or an RRC Set Up message may be obtained.

In an embodiment of the present disclosure, the UE may obtain the predefined measurement relaxation parameter only through the above first, second, or third method. In an embodiment of the present disclosure, the method for the UE to obtain the predefined measurement relaxation parameter indicated by the base station may also be any combination of the above methods.

Further, after acquiring the predefined measurement relaxation parameter, the UE may perform the measurement relaxation based on the predefined measurement relaxation parameter. It should be noted that, when the contents included in the predefined measurement relaxation parameter are different, specific operations for performing the measurement relaxation are different.

Specifically, in an embodiment of the present disclosure, when the predefined measurement relaxation parameter includes the measurement suspending duration, the method for the UE to perform the measurement relaxation based on the predefined measurement relaxation parameter may specifically include: based on the measurement suspending duration, suspending the measurement for a period of time. For example, in an embodiment of the present disclosure, assuming that the measurement suspending duration received by the UE is one hour, the UE may suspend the measurement for one hour.

In another embodiment of the present disclosure, when the predefined measurement relaxation parameter includes the extension factor of the measurement period, the method for the UE to perform the measurement relaxation based on the measurement relaxation parameter may specifically include: determining a product of the extension factor and the measurement period in the normal measurement state as the measurement period in the measurement relaxation state, and performing the relaxation measurement based on the measurement period in the measurement relaxation state. In an embodiment of the present disclosure, the extension factor may specifically be a natural number greater than 1.

It should be noted that, in an embodiment of the present disclosure, the measurement period in the normal measurement state is calculated by the UE based on a calculation formula. Specifically, when a discontinuous reception (DRX) and a measurement gap (time interval) are not configured, the measurement period in the normal measurement state=max(200 ms, 5×SMTC period). In an embodiment of the present disclosure, the SMTC period may be carried in the measurement configuration information configured by the base station to the UE and applied in the normal measurement state. In another embodiment of the present disclosure, the UE may also calculate the measurement period in the normal measurement state based on the DRX cycle and a measurement gap repetition period (MGRP).

In an embodiment of the present disclosure, when the UE performs measurement based on the measurement period, it can obtain a measurement result in a measurement period, in which the measurement result is specifically obtained through evaluation of multiple measurement sample points (that is, multiple SMTCs).

Further, in yet another embodiment of the present disclosure, when the measurement relaxation parameter includes one or more dedicated measurement frequencies, the method for the UE to perform the measurement relaxation based on the measurement relaxation parameter may specifically include: the UE performing measurement only for the measurement identifier that includes the dedicated frequency, in which each measurement identifier is matched with both a measurement object and a reporting configuration; and the UE performing corresponding measurement based on the measurement object and the reporting configuration matched with the measurement identifier.

As an example, in an embodiment of the present disclosure, it is assumed that the dedicated measurement frequency is 3 GHZ (gigahertz), the UE may perform measurement only for the measurement identifier including the 3 GHZ frequency band, and not perform measurement for the measurement identifiers including other frequency bands, so as to realize relaxation measurement.

In another embodiment of the present disclosure, when the measurement relaxation parameter includes the predefined SMTC, the method for the UE to perform the measurement relaxation based on the measurement relaxation parameter may specifically include, replacing the SMTC included in measurement configuration information in the normal measurement state with the predefined SMTC.

For example, in an embodiment of the present disclosure, it is assumed that the period of the SMTC in the normal measurement state is 5 ms, and the period of the predefined SMTC is 20 ms. Then when the UE performs the measurement relaxation based on the predefined SMTC, the UE performs RRM measurement according to the period (i.e., 20 ms) of the predefined SMTC.

In another embodiment of the present disclosure, when the measurement relaxation parameter includes the predefined SMTC, the method for the UE to perform the measurement relaxation based on the measurement relaxation parameter may specifically include: using the predefined SMTC to replace the SMTC included in the measurement configuration information in the normal measurement state.

For example, in an embodiment of the present disclosure, assume that a window length of the SMTC in the normal measurement state is 5 ms, and that a window length of the predefined SMTC is 3 ms. Then when the UE performs the measurement relaxation based on the predefined SMTC, the UE performs the RRM measurement according to the window length (i.e., 3 ms) of the predefined SMTC.

In another embodiment of the present disclosure, when the measurement relaxation parameter includes the predefined SSB-ToMeasure parameter, the method for the UE to perform the measurement relaxation based on the measurement relaxation parameter may specifically include: using the predefined SSB-ToMeasure parameter to replace an SSB-ToMeasure parameter included in the measurement configuration information in the normal measurement state.

For example, in an embodiment of the present disclosure, it is assumed that the number of measurement beams corresponding to the SSB-ToMeasure parameter in the normal measurement state is 32, and that the number of measurement beams corresponding to the predefined SSB-ToMeasure parameter is 8. Then when the UE performs the measurement relaxation based on the predefined SSB-ToMeasure parameter, the UE performs the RRM measurement according to the predefined SSB-ToMeasure parameter (i.e., 8).

In another embodiment of the present disclosure, when the measurement relaxation parameter includes the one or more predefined types of one or more pilot signals to be measured, the method for the UE to perform the measurement relaxation based on the measurement relaxation parameter may specifically include: using the one or more predefined types of one or more pilot signals to be measured to replace types of pilot signals to be measured in the normal measurement state. For example, in an embodiment of the present disclosure, it is assumed that the pilot signals to be measured in the normal measurement state are SSB and CSI-RS (Channel State Information Reference Signal), and that the predefined type of the pilot signal to be measured is SSB. Then when the UE performs the measurement relaxation based on the predefined type of the pilot signal to be measured, the UE can only measure the pilot signal SSB.

In addition, it should be noted that, in an embodiment of the present disclosure, when the measurement relaxation parameter includes at least two parameters in the above step 303, the UE may perform the measurement relaxation based on a combination of the at least two measurement relaxation parameters.

As an example, in an embodiment of the present disclosure, it is assumed that the measurement relaxation parameter received by the UE includes the expansion factor of the measurement period and the predefined type of the pilot signal to be measured (pilot signal SSB). Then the UE can multiply the measurement period in the normal measurement state by the expansion factor K to obtain a new measurement period, perform measurement only on the pilot signal SSB based on the new measurement period, and perform measurement on other measurement parameters (such as a measurement frequency, a period and a window length of the SMTC, an SSB-ToMeasure parameter) according to the measurement relaxation parameter in the normal measurement state.

It should also be noted that, in an embodiment of the present disclosure, when the UE in the connected state satisfies different relaxation criteria, the contents included in the corresponding predefined measurement relaxation parameter may be the same.

In another embodiment of the present disclosure, when the UE in the connected state satisfies different relaxation criteria, the contents included in the corresponding predefined measurement relaxation parameter may be different. In an embodiment of the present disclosure, when the contents of the predefined measurement relaxation parameter corresponding to the UE under different relaxation criteria are different, the relaxation degree of the predefined measurement relaxation parameter corresponding to the UE meeting the stationary criterion may be greater than the relaxation degree of the predefined measurement relaxation parameter corresponding to the UE meeting the low mobility criterion and greater than the relaxation degree of the predefined measurement relaxation parameter corresponding to the UE meeting the non-cell edge criterion.

For example, in an embodiment of the present disclosure, the predefined measurement relaxation parameter corresponding to the UE meeting the stationary criterion may include the measurement suspending duration. The predefined measurement relaxation parameter corresponding to the UE meeting the low mobility criterion may include the extension factor of the measurement period. The predefined measurement relaxation parameter corresponding to the UE meeting the non-cell edge criterion may include the dedicated measurement frequency.

To sum up, in the measurement relaxation instruction method provided by the embodiment of the present disclosure, the UE in the connected state can obtain the relaxation instruction information and/or the relaxation measurement configuration information sent by the base station, and switch from the normal measurement state to the measurement relaxation state based on the information sent by the base station. Therefore, the embodiment of the present disclosure proposes a measurement relaxation instruction method applied to a UE in a connected state, so that the UE in the connected state can switch between the normal measurement state and the measurement relaxation state, thus ensuring performance of the UE and reducing a power consumption. Moreover, in the embodiment of the present disclosure, the UE sends a request to the base station to switch to the measurement relaxation state after determining that it satisfies the relaxation criteria, so as to ensure that every time the UE in the connected state switches to the measurement relaxation state when necessary, thus ensuring a switching accuracy.

Figure 4:
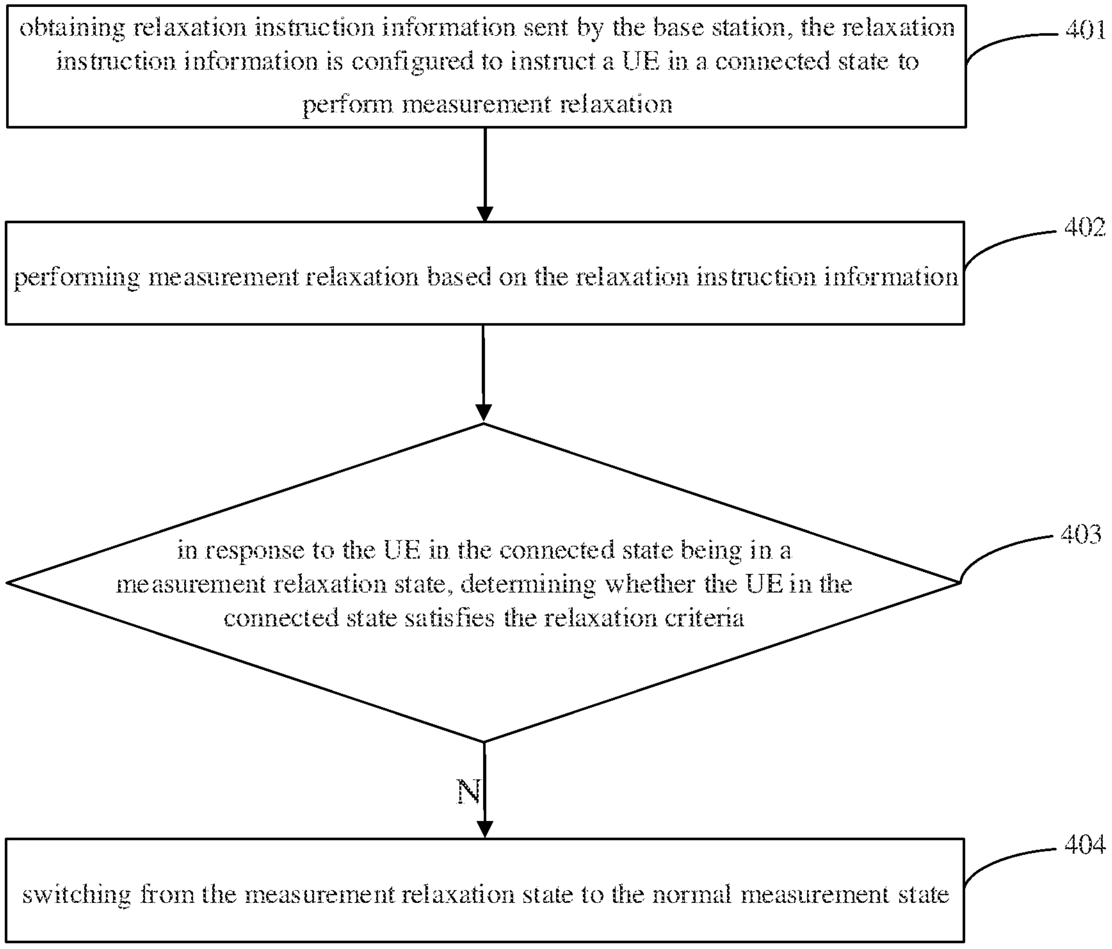
FIG. 4 is a flowchart illustrating a measurement relaxation instruction method according to another embodiment of the present disclosure.

FIG. 4 is a flowchart illustrating a measurement relaxation instruction method according to another embodiment of the present disclosure, which is applied to a UE. As shown in FIG. 4, the measurement relaxation instruction method may include the following steps.

Step 401, relaxation instruction information sent by the base station is obtained. The relaxation instruction information is configured to instruct a UE in a connected state to perform measurement relaxation.

Alternatively, in an embodiment of the present disclosure, the UE may first determine whether the UE in the connected state satisfies relaxation criteria, and the relaxation criteria include at least one of a low mobility criterion, a non-cell edge criterion, and a stationary criterion. When the UE in the connected state satisfies the relaxation criteria, the UE may send a third measurement report to the base station, and receive the relaxation instruction information sent by the base station based on the third measurement report.

Step 402, measurement relaxation is performed based on the relaxation instruction information.

For detailed introduction of steps 401-402, reference may be made to the relevant introduction in the foregoing embodiments, which is not elaborated in the embodiment of the present disclosure.

Step 403, in response to the UE in the connected state being in a measurement relaxation state, it is determined whether the UE in the connected state satisfies the relaxation criteria, which may include the low mobility criterion, the non-cell edge criterion, and the stationary criterion.

For detailed introduction of determining whether the UE in the connected state satisfies the relaxation criteria, reference may be made to the relevant introduction in the foregoing embodiments, which is not elaborated in the embodiment of the present disclosure.

It should be noted that, in an embodiment of the present disclosure, if the UE in the connected state does not satisfy any criterion in the relaxation criteria, it is determined that the UE in the connected state does not satisfy the relaxation criteria, and step 404 is executed.

Step 404, it is switched from the measurement relaxation state to the normal measurement state.

In an embodiment of the present disclosure, the UE may obtain measurement configuration information in the normal measurement state, and perform measurement based on the measurement configuration information in the normal measurement state, so as to switch to the normal measurement state. In an embodiment of the present disclosure, the measurement configuration information in the normal measurement state may be configured by the base station to the UE through an RRC message before the UE performs switching to the measurement relaxation state in step 404.

To sum up, in the measurement relaxation instruction method provided by the embodiment of the present disclosure, the UE in the connected state can obtain the relaxation instruction information and/or the relaxation measurement configuration information sent by the base station, and switch from the normal measurement state to the measurement relaxation state based on the information sent by the base station. Therefore, the embodiment of the present disclosure proposes a measurement relaxation instruction method applied to a UE in a connected state, so that the UE in the connected state can switch between the normal measurement state and the measurement relaxation state, thus ensuring performance of the UE and reducing a power consumption. Moreover, in the embodiment of the present disclosure, the UE sends a request to the base station to switch to the measurement relaxation state after determining that it satisfies the relaxation criteria, so as to ensure that every time the UE in the connected state switches to the measurement relaxation state when necessary, thus ensuring a switching accuracy.

Figure 5:
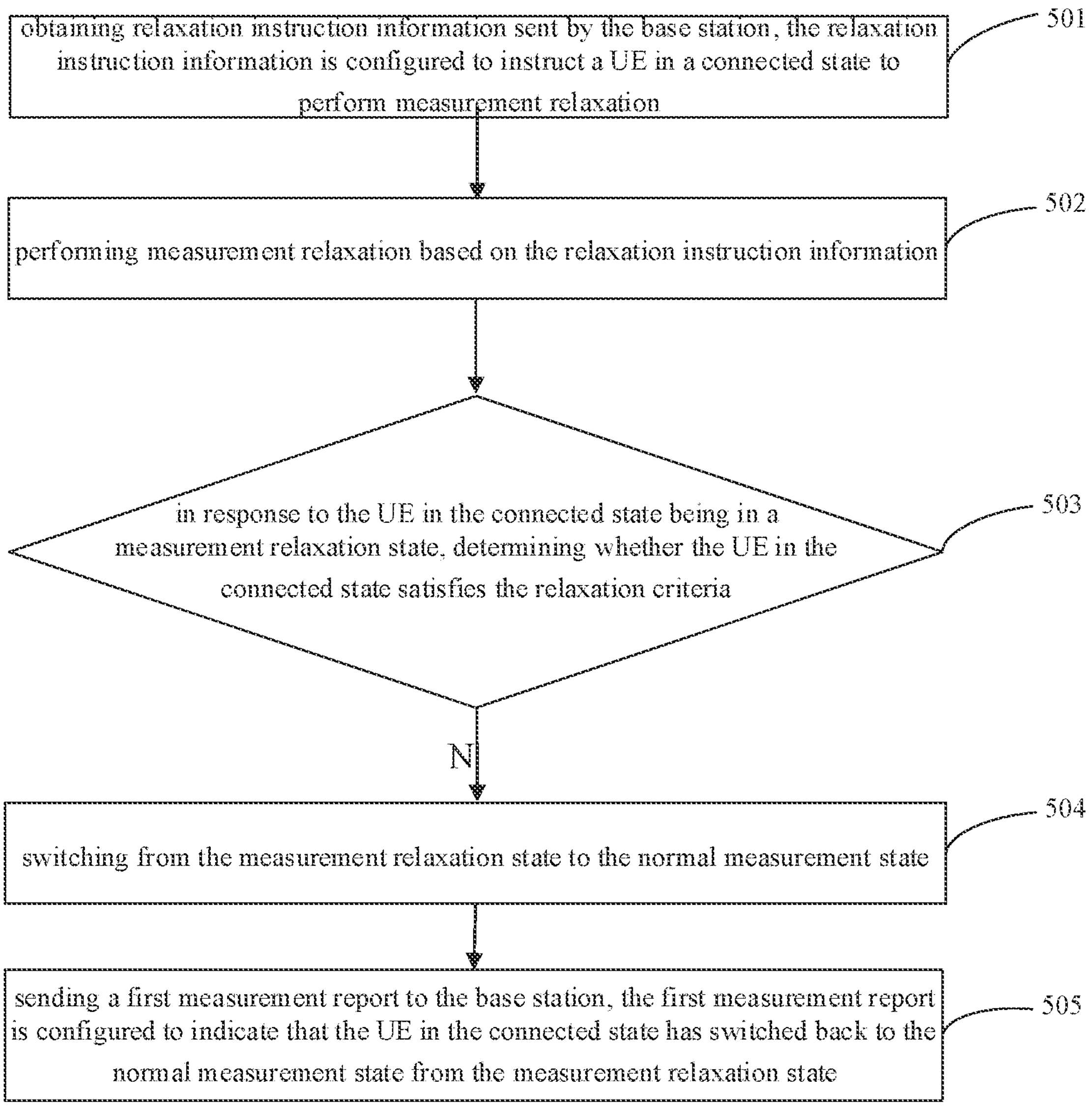
FIG. 5 is a flowchart illustrating a measurement relaxation instruction method according to another embodiment of the present disclosure.

FIG. 5 is a flowchart illustrating a measurement relaxation instruction method according to another embodiment of the present disclosure, which is applied to a UE. As shown in FIG. 5, the measurement relaxation instruction method may include the following steps.

Step 501, relaxation instruction information sent by a base station is obtained. The relaxation instruction information is configured to instruct a UE in a connected state to perform measurement relaxation.

Alternatively, in an embodiment of the present disclosure, the UE may first determine whether the UE in the connected state satisfies relaxation criteria, and the relaxation criteria include at least one of a low mobility criterion, a non-cell edge criterion, and a stationary criterion. When the UE in the connected state satisfies the relaxation criteria, the UE may send a third measurement report to the base station, and receive the relaxation instruction information sent by the base station based on the third measurement report.

Step 502, measurement relaxation is performed based on the relaxation instruction information.

Step 503, in response to the UE in the connected state being in a measurement relaxation state, it is determined whether the UE in the connected state satisfies the relaxation criteria, which may include the low mobility criterion, the non-cell edge criterion, and the stationary criterion.

Step 504, it is switched from the measurement relaxation state to the normal measurement state.

For detailed introduction of steps 501-504, reference may be made to the relevant introduction in the foregoing embodiments, which is not elaborated in the embodiment of the present disclosure.

Step 505, a first measurement report is sent to the base station. The first measurement report is configured to indicate that the UE in the connected state has switched back to the normal measurement state from the measurement relaxation state.

To sum up, in the measurement relaxation instruction method provided by the embodiment of the present disclosure, the UE in the connected state can obtain the relaxation instruction information and/or the relaxation measurement configuration information sent by the base station, and switch from the normal measurement state to the measurement relaxation state based on the information sent by the base station. Therefore, the embodiment of the present disclosure proposes a measurement relaxation instruction method applied to a UE in a connected state, so that the UE in the connected state can switch between the normal measurement state and the measurement relaxation state, thus ensuring performance of the UE and reducing a power consumption. Moreover, in the embodiment of the present disclosure, the UE sends a request to the base station to switch to the measurement relaxation state after determining that it satisfies the relaxation criteria, so as to ensure that every time the UE in the connected state switches to the measurement relaxation state when necessary, thus ensuring a switching accuracy.

Figure 6:
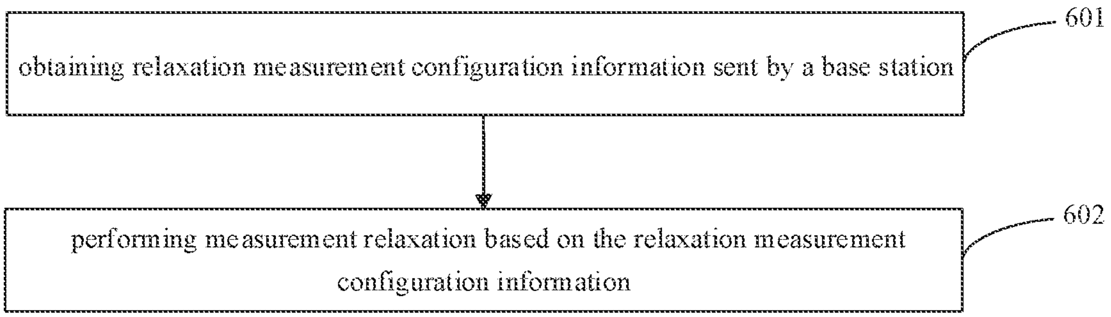
FIG. 6 is a flowchart illustrating a measurement relaxation instruction method according to another embodiment of the present disclosure.

FIG. 6 is a flowchart illustrating a measurement relaxation instruction method according to another embodiment of the present disclosure, which is applied to a UE. As shown in FIG. 6, the measurement relaxation instruction method may include the following steps.

Step 601, relaxation measurement configuration information sent by a base station is obtained.

Alternatively, in an embodiment of the present disclosure, the UE may first determine whether a UE in a connected state satisfies relaxation criteria, and the relaxation criteria include at least one of a low mobility criterion, a non-cell edge criterion, and a stationary criterion. When the UE in the connected state satisfies the relaxation criteria, the UE may send a third measurement report to the base station, and receive the relaxation measurement configuration information sent by the base station based on the third measurement report.

In an embodiment of the present disclosure, the relaxation measurement configuration information may include at least one of the following:

- a deletion indication of measurement configuration information in the normal measurement state;
- a new measurement period, in which the new measurement period is longer than a measurement period in the normal measurement state;
- one or more new measurement frequencies, in which a number of the one or more new measurement frequencies is less than a number of measurement frequencies in the normal measurement state;
- a new SMTC, in which a period of the new SMTC is greater than a period of an SMTC in the normal measurement state;
- a new SMTC, in which a window length of the new SMTC is smaller than a window length of an SMTC in the normal measurement state;
- a new SSB-ToMeasure parameter, in which a number of measurement beams corresponding to the new SSB-ToMeasure parameter is less than a number of measurement beams corresponding to an SSB-ToMeasure parameter in the normal measurement state; or
- one or more new pilot signals to be measured, in which a number of one or more types of the one or more new pilot signals to be measured is less than a number of types of pilot signals in the normal measurement state.

In an embodiment of the present disclosure, the relaxation measurement configuration information may be only any one of the above configuration information. In another embodiment of the present disclosure, the relaxation measurement configuration information may be any combination of the above configuration information.

Step 602, measurement relaxation is performed based on the relaxation measurement configuration information.

In an embodiment of the present disclosure, when the contents included in the relaxation measurement configuration information are different, the operations of performing the measurement relaxation are also different.

Specifically, in an embodiment of the present disclosure, when the relaxation measurement configuration information includes a deletion indication of the measurement configuration information in the normal measurement state, the method for the UE to perform the measurement relaxation based on the relaxation measurement configuration information may specifically include: deleting the measurement configuration information in the normal measurement state to stop performing measurement on RRM. For example, in an embodiment of the present disclosure, the UE may stop performing measurement on RRM by deleting all measurement identifiers in the measurement configuration information in the normal measurement state. It should be noted that, in an embodiment of the present disclosure, when the relaxation measurement configuration information includes a deletion indication of the measurement configuration information in the normal measurement state, the base station can send the original measurement configuration information (that is, the original configuration) in the normal measurement state to the UE through an RRC message (such as an RRC reconfiguration message or an RRC Resume message) within a preset time period after the base station sends the relaxation measurement configuration information, so as to ensure that the UE in the connected state can successfully switch back to the normal measurement state based on the original configuration. The preset time period may be 24 hours, for example.

In another embodiment of the present disclosure, when the relaxation measurement configuration information includes the new measurement period, the method for the UE to perform the measurement relaxation based on the relaxation measurement configuration information may specifically include: directly using the new measurement period to perform the measurement relaxation.

For example, in an embodiment of the present disclosure, assuming that the measurement period in the normal measurement state is 200 ms, the new measurement period may be 400 ms, and the UE may perform the measurement relaxation based on the new measurement period, i.e., 400 ms.

In another embodiment of the present disclosure, when the relaxation measurement configuration information includes the new measurement frequency, the method for the UE to perform the measurement relaxation based on the relaxation measurement configuration information may specifically include: performing the measurement relaxation only for the measurement identifier including the new measurement frequency, in which each measurement identifier is matched with both a measurement object and a reporting configuration, and the UE can perform corresponding measurement based on the measurement object and the reporting configuration matched with the measurement identifier.

For example, in an embodiment of the present disclosure, assuming that the new measurement frequency is 3 GHZ (gigahertz), the UE performs the measurement only for the signal in the 3 GHZ frequency band, and does not perform the measurement for the signals in other frequency bands, so as to realize relaxation measurement.

In another embodiment of the present disclosure, when the relaxation measurement configuration information includes the new SMTC period, the method for the UE to perform the measurement relaxation based on the relaxation measurement configuration information may specifically include: directly using the new SMTC period to perform the measurement relaxation.

For example, in an embodiment of the present disclosure, assuming that the SMTC period in the normal measurement state is 5 ms, the new SMTC period may be 20 ms, and the UE may perform the measurement relaxation based on the new SMTC period, i.e., 20 ms.

In another embodiment of the present disclosure, when the relaxation measurement configuration information includes the new SMTC window length, the method for the UE to perform the measurement relaxation based on the relaxation measurement configuration information may specifically include: directly using the new SMTC window length to perform the measurement relaxation.

For example, in an embodiment of the present disclosure, assuming that the SMTC window length in the normal measurement state is 5 ms, the new SMTC window length can be 3 ms, and the UE can perform the measurement relaxation based on the new SMTC window length, i.e., 3 ms.

In another embodiment of the present disclosure, when the relaxation measurement configuration information includes the new SSB-ToMeasure parameter, the method for the UE to perform the measurement relaxation based on the relaxation measurement configuration information may specifically include: directly using the new SSB-ToMeasure parameter to perform the measurement relaxation.

For example, in an embodiment of the present disclosure, assuming that the number of measurement beams corresponding to the SSB-ToMeasure parameter in the normal measurement state is 32, the number of measurement beams corresponding to the new SSB-ToMeasure parameter may be 8, and the UE may perform the measurement relaxation based on the new SSB-ToMeasure parameter, i.e., 8.

In another embodiment of the present disclosure, when the relaxation measurement configuration information includes the new pilot signal to be measured, the method for the UE to perform the measurement relaxation based on the relaxation measurement configuration information may specifically include, directly performing the measurement relaxation based on the new pilot signal to be measured.

For example, in an embodiment of the present disclosure, assuming that the pilot signals to be measured in the normal measurement state are SSB and CSI-RS, the new pilot signal to be measured can be only SSB, and the UE can only perform measurement on the pilot signal SSB, and only report a measurement result for SSB.

In addition, it should be noted that, in an embodiment of the present disclosure, when the UE in the connected state satisfies different relaxation criteria, the contents included in the corresponding relaxation measurement configuration information may be the same.

In another embodiment of the present disclosure, when the UE in the connected state satisfies different relaxation criteria, the contents included in the corresponding relaxation measurement configuration information may be different. In an embodiment of the present disclosure, when the contents of the relaxation measurement configuration information corresponding to the UE under different relaxation criteria are different, the relaxation degree of the relaxation measurement configuration information corresponding to the UE satisfying the stationary criterion may be greater than the relaxation degree of the relaxation measurement configuration information corresponding to the UE satisfying the low mobility criterion and greater than the relaxation degree of the relaxation measurement configuration information corresponding to the UE satisfying the non-cell edge criterion.

For example, in an embodiment of the present disclosure, the relaxation measurement configuration information corresponding to the UE satisfying the stationary criterion may include a deletion indication of the measurement configuration information in the normal measurement state. The relaxation measurement configuration information corresponding to the UE satisfying the low mobility criterion may include the extension factor of the measurement period. The relaxation measurement configuration information corresponding to the UE satisfying the non-cell edge criterion may include the dedicated measurement frequency.

To sum up, in the measurement relaxation instruction method provided by the embodiment of the present disclosure, the UE in the connected state can obtain the relaxation instruction information and/or the relaxation measurement configuration information sent by the base station, and switch from the normal measurement state to the measurement relaxation state based on the information sent by the base station. Therefore, the embodiment of the present disclosure proposes a measurement relaxation instruction method applied to a UE in a connected state, so that the UE in the connected state can switch between the normal measurement state and the measurement relaxation state, thus ensuring performance of the UE and reducing a power consumption. Moreover, in the embodiment of the present disclosure, the UE sends a request to the base station to switch to the measurement relaxation state after determining that it satisfies the relaxation criteria, so as to ensure that every time the UE in the connected state switches to the measurement relaxation state when necessary, thus ensuring a switching accuracy.

Figure 7:
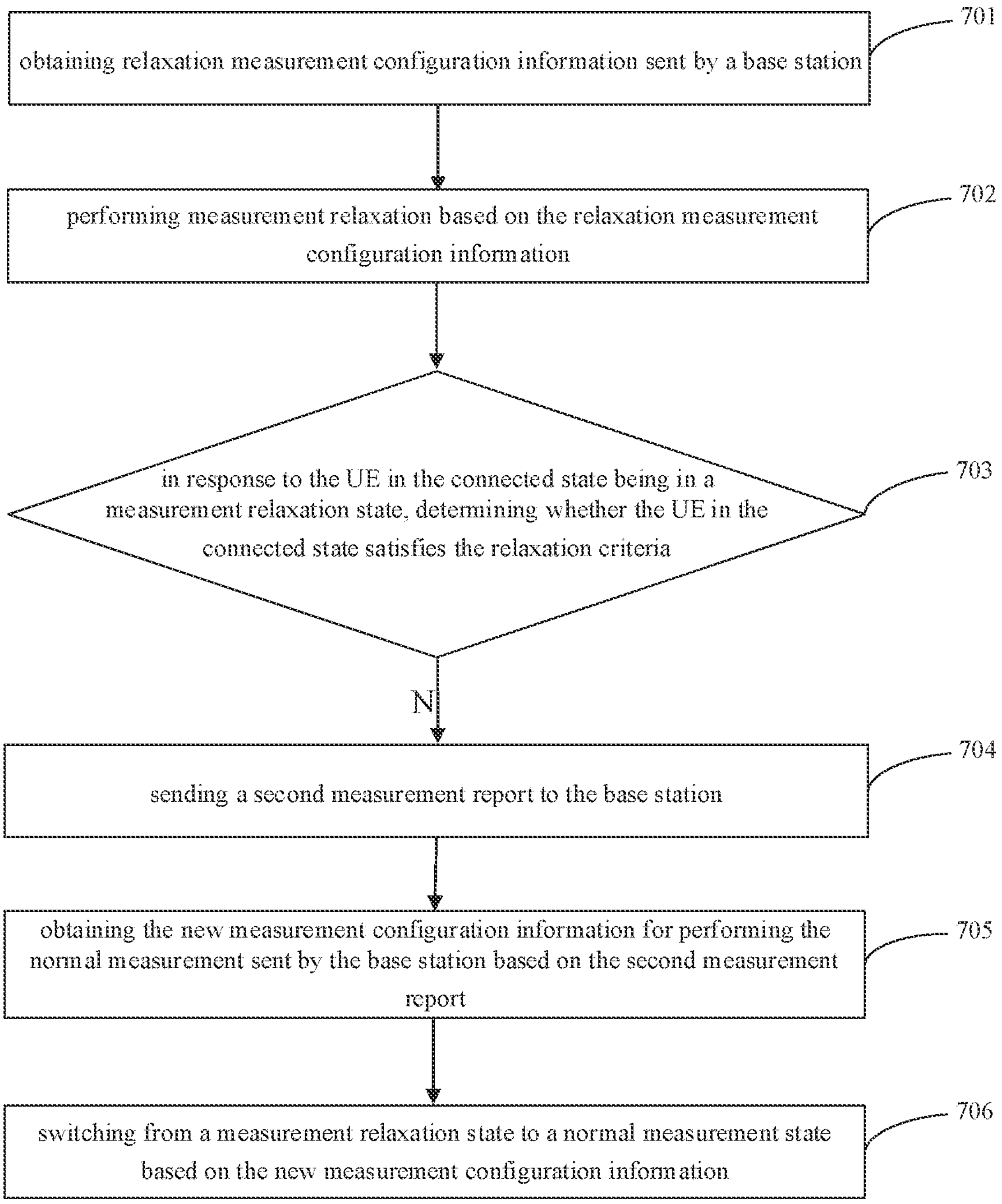
FIG. 7 is a flowchart illustrating a measurement relaxation instruction method according to another embodiment of the present disclosure.

FIG. 7 is a flowchart illustrating a measurement relaxation instruction method according to another embodiment of the present disclosure, which is applied to a UE. As shown in FIG. 7, the measurement relaxation instruction method may include the following steps.

Step 701, relaxation measurement configuration information sent by a base station is obtained.

Alternatively, in an embodiment of the present disclosure, the UE may first determine whether a UE in a connected state satisfies relaxation criteria, and the relaxation criteria include at least one of a low mobility criterion, a non-cell edge criterion, and a stationary criterion. When the UE in the connected state satisfies the relaxation criteria, the UE may send a third measurement report to the base station, and receive the relaxation measurement configuration information sent by the base station based on the third measurement report.

Step 702, measurement relaxation is performed based on the relaxation measurement configuration information.

For detailed introduction of steps 701-702, reference may be made to the relevant introduction in the foregoing embodiments, which is not elaborated in the embodiment of the present disclosure.

Step 703, in response to the UE in the connected state being in a measurement relaxation state, it is determined whether the UE in the connected state satisfies the relaxation criteria, which may include the low mobility criterion, the non-cell edge criterion, and the stationary criterion.

For detailed introduction of determining whether the UE in the connected state satisfies the relaxation criteria, reference may be made to the relevant introduction in the foregoing embodiments, which is not elaborated in the embodiment of the present disclosure. In response to the UE in the connected state not satisfying the relaxation criteria, step 704 is executed.

Step 704, a second measurement report is sent to the base station.

In an embodiment of the present disclosure, the second measurement report may be configured to indicate to the base station that the current UE in the connected state does not satisfy the relaxation criteria, so that the base station sends new measurement configuration information for performing normal measurement to the UE in the connected state based on the second measurement report.

Step 705, the new measurement configuration information for performing the normal measurement sent by the base station based on the second measurement report is obtained.

Step 706, it is switched from a measurement relaxation state to a normal measurement state based on the new measurement configuration information.

In an embodiment of the present disclosure, the UE may perform measurement based on the new measurement configuration information to switch to the normal measurement state.

To sum up, in the measurement relaxation instruction method provided by the embodiment of the present disclosure, the UE in the connected state can obtain the relaxation instruction information and/or the relaxation measurement configuration information sent by the base station, and switch from the normal measurement state to the measurement relaxation state based on the information sent by the base station. Therefore, the embodiment of the present disclosure proposes a measurement relaxation instruction method applied to a UE in a connected state, so that the UE in the connected state can switch between the normal measurement state and the measurement relaxation state, thus ensuring performance of the UE and reducing a power consumption. Moreover, in the embodiment of the present disclosure, the UE sends a request to the base station to switch to the measurement relaxation state after determining that it satisfies the relaxation criteria, so as to ensure that every time the UE in the connected state switches to the measurement relaxation state when necessary, thus ensuring a switching accuracy.

Figure 8:
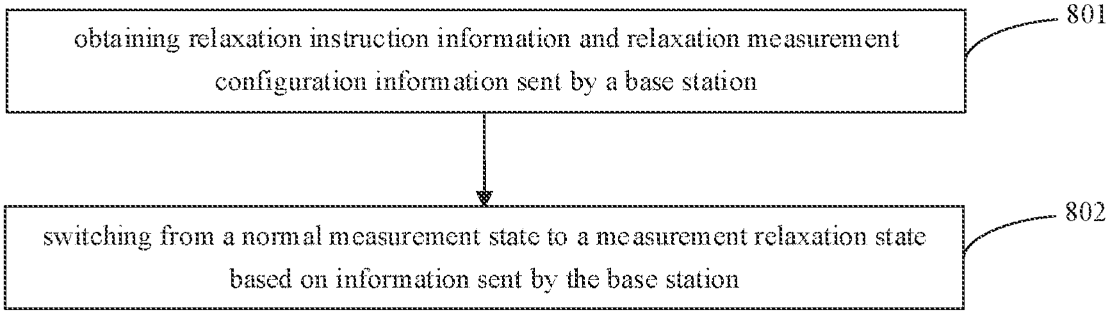
FIG. 8 is a flowchart illustrating a measurement relaxation instruction method according to another embodiment of the present disclosure.

FIG. 8 is a flowchart illustrating a measurement relaxation instruction method according to another embodiment of the present disclosure, which is applied to a UE. As shown in FIG. 8, the measurement relaxation instruction method may include the following steps.

Step 801, relaxation instruction information and relaxation measurement configuration information sent by the base station are obtained.

Step 802, it is switched from a normal measurement state to a measurement relaxation state based on information sent by the base station.

For detailed introduction of steps 801-802, reference may be made to the relevant introduction in the foregoing embodiments, which is not elaborated in the embodiment of the present disclosure.

To sum up, in the measurement relaxation instruction method provided by the embodiment of the present disclosure, the UE in the connected state can obtain the relaxation instruction information and/or the relaxation measurement configuration information sent by the base station, and switch from the normal measurement state to the measurement relaxation state based on the information sent by the base station. Therefore, the embodiment of the present disclosure proposes a measurement relaxation instruction method applied to a UE in a connected state, so that the UE in the connected state can switch between the normal measurement state and the measurement relaxation state, thus ensuring performance of the UE and reducing a power consumption.

Figure 9:
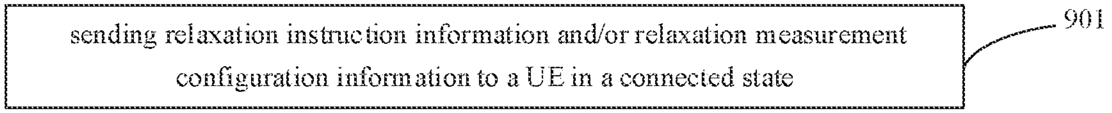
FIG. 9 is a flowchart illustrating a measurement relaxation instruction method according to another embodiment of the present disclosure.

FIG. 9 is a flowchart illustrating a measurement relaxation instruction method according to another embodiment of the present disclosure, which is applied to a base station. As shown in FIG. 9, the measurement relaxation instruction method may include the following steps.

Step 901, relaxation instruction information and/or relaxation measurement configuration information is sent to a UE in a connected state.

In an embodiment of the present disclosure, the specific method for the base station to send the relaxation instruction information and/or the relaxation measurement configuration information to the UE in the connected state may include: the base station sending the relaxation instruction information and/or the relaxation measurement configuration information to the UE in the connected state through a DL-DCCH. Specifically, in an embodiment of the present disclosure, the base station may send the relaxation instruction information and/or the relaxation measurement configuration information to the UE in the connected state through an RRC message. For example, the base station may send the relaxation instruction information through an RRC Reconfiguration message or an RRC Resume message or an RRC Set Up message, and send the relaxation measurement configuration information through an RRC Reconfiguration message or an RRC Resume message.

In an embodiment of the present disclosure, the base station may only send the relaxation instruction information to the UE in the connected state. In another embodiment of the present disclosure, the base station may only send the relaxation measurement configuration information to the UE in the connected state. In yet another embodiment of the present disclosure, the base station may send the relaxation instruction information and the relaxation measurement configuration information to the UE in the connected state.

To sum up, in the measurement relaxation instruction method provided by the embodiment of the present disclosure, the base station can send the relaxation instruction information and/or the relaxation measurement configuration information to the UE in the connected state, and the UE in the connected state can switch from a normal measurement state to a measurement relaxation state based on the information sent by the base station. Therefore, the embodiment of the present disclosure proposes a measurement relaxation instruction method applied to the UE in the connected state, so that the UE in the connected state can switch between the normal measurement state and the measurement relaxation state, thus ensuring performance of the UE and reducing a power consumption.

Figure 10:
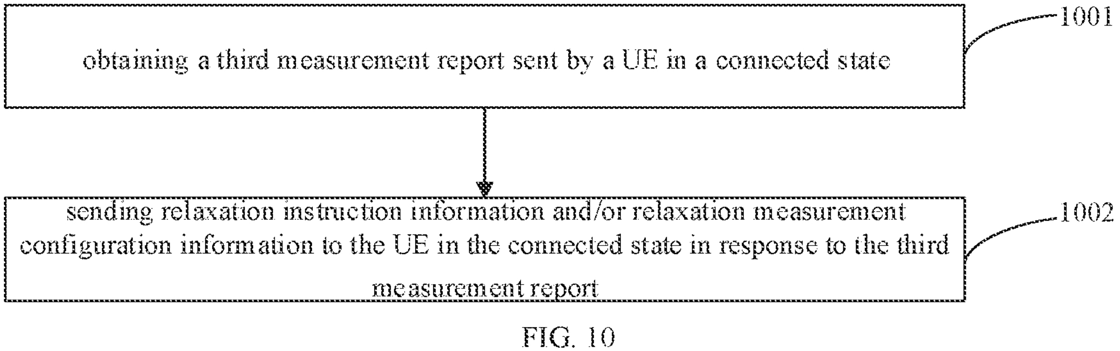
FIG. 10 is a flowchart illustrating a measurement relaxation instruction method according to another embodiment of the present disclosure.

FIG. 10 is a flowchart illustrating a measurement relaxation instruction method according to another embodiment of the present disclosure, which is applied to a base station. As shown in FIG. 10, the measurement relaxation instruction method may include the following steps.

Step 1001, a third measurement report sent by a UE in a connected state is obtained.

In an embodiment of the present disclosure, the method for the base station to obtain the third measurement report sent by the UE in the connected state may specifically include: obtaining the third measurement report sent by the UE in the connected state to the base station through an UL-DCCH. For example, in an embodiment of the present disclosure, the UE may send the third measurement report to the base station through an RRC message (such as a measurement report message).

Step 1002, relaxation instruction information and/or relaxation measurement configuration information is sent to the UE in the connected state in response to the third measurement report.

For detailed introduction of step 1002, reference may be made to the relevant introduction in the foregoing embodiments, which is not elaborated in the embodiment of the present disclosure.

To sum up, in the measurement relaxation instruction method provided by the embodiment of the present disclosure, the base station can send the relaxation instruction information and/or the relaxation measurement configuration information to the UE in the connected state, and the UE in the connected state can switch from a normal measurement state to a measurement relaxation state based on the information sent by the base station. Therefore, the embodiment of the present disclosure proposes a measurement relaxation instruction method applied to the UE in the connected state, so that the UE in the connected state can switch between the normal measurement state and the measurement relaxation state, thus ensuring performance of the UE and reducing a power consumption.

Figure 11:
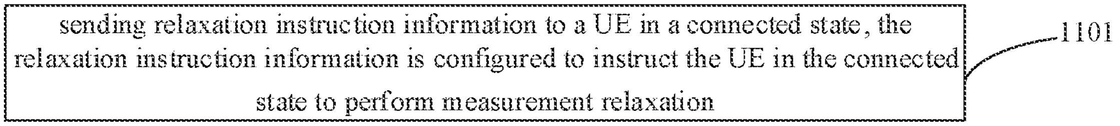
FIG. 11 is a flowchart illustrating a measurement relaxation instruction method according to another embodiment of the present disclosure.

FIG. 11 is a flowchart of illustrating a measurement relaxation instruction method according to another embodiment of the present disclosure, which is applied to a base station. As shown in FIG. 11, the measurement relaxation instruction method may include the following steps.

Step 1101, relaxation instruction information is sent to a UE in a connected state. The relaxation instruction information is configured to instruct the UE in the connected state to perform measurement relaxation.

Alternatively, in an embodiment of the present disclosure, the base station may send the relaxation instruction information to the UE in the connected state in response to the third measurement report sent by the UE in the connected state. The third measurement report may be sent by the UE to the base station when determining that the UE in the connected state satisfies relaxation criteria, and the relaxation criteria include at least one of a low mobility criterion, a non-cell edge criterion, and a stationary criterion.

In an embodiment of the present disclosure, the relaxation instruction information may include a predefined measurement relaxation parameter, so that the UE may perform measurement relaxation directly based on the measurement relaxation parameter in the relaxation instruction information. In another implementation of the present disclosure, the relaxation instruction information may not include the predefined measurement relaxation parameter, and the base station may indicate the predefined measurement relaxation parameter to the UE in the connected state after sending the relaxation instruction information to the UE in the connected state, so that the UE performs measurement relaxation based on the measurement relaxation parameter.

Further, in an embodiment of the present disclosure, the method for the base station to indicate the predefined measurement relaxation parameter to the UE in the connected state may include at least one of the following.

First method, the predefined measurement relaxation parameter is sent to the UE in the connected state through a system message. For example, in an embodiment of the present disclosure, the predefined measurement relaxation parameter is broadcast by the base station through a system information block (SIB) X, where X may be any SIB.

Second method, the predefined measurement relaxation parameter is indicated to the UE in the connected state based on a protocol. For example, in an embodiment of the present disclosure, the predefined measurement relaxation parameter is indicated by the base station based on the TS38.331 protocol.

Third method, the predefined measurement relaxation parameter is sent to the UE in the connected state through an RRC message. For example, in an embodiment of the present disclosure, the predefined measurement relaxation parameter is sent by the base station to the UE through an RRC Reconfiguration message, an RRC Resume message, or an RRC Set Up message.

Specifically, in an embodiment of the present disclosure, the base station may indicate the predefined measurement relaxation parameter to the UE in the connected state only through the first, second, or third method above. In an embodiment of the present disclosure, the method for the base station to indicate the predefined measurement relaxation parameter to the UE in the connected state may also be any combination of the above methods.

Further, in an embodiment of the present disclosure, the measurement relaxation parameter may include at least one of the following:

a measurement suspending duration;

an expansion factor of a measurement period, in which the expansion factor of the measurement period is a natural number greater than 1;

one or more dedicated measurement frequencies (i.e., measurement frequency band), in which a number of the one or more dedicated measurement frequencies is less than a number of measurement frequencies in the normal measurement state;

a predefined SMTC, in which a period of the predefined SMTC is greater than a period of an SMTC in the normal measurement state, a predefined SMTC, in which a window length of the predefined SMTC is smaller than a window length of an SMTC in the normal measurement state;

a predefined SSB-ToMeasure parameter, in which a number of measurement beams corresponding to the predefined SSB-ToMeasure parameter is less than a number of measurement beams corresponding to an SSB-ToMeasure parameter in the normal measurement state; or one or more predefined types of one or more pilot signals to be measured, in which a number of the one or more predefined types of one or more pilot signals to be measured is less than a number of types of pilot signals to be measured in the normal measurement state.

In an embodiment of the present disclosure, the measurement relaxation parameter may be only any one of the above parameters. In another embodiment of the present disclosure, the measurement relaxation parameter may be any combination of the above parameters.

For detailed introduction about the measurement relaxation parameter, reference may be made to the relevant introduction in the foregoing embodiments, which is not elaborated in the embodiment of the present disclosure.

To sum up, in the measurement relaxation instruction method provided by the embodiment of the present disclosure, the base station can send the relaxation instruction information and/or the relaxation measurement configuration information to the UE in the connected state, and the UE in the connected state can switch from a normal measurement state to a measurement relaxation state based on the information sent by the base station. Therefore, the embodiment of the present disclosure proposes a measurement relaxation instruction method applied to the UE in the connected state, so that the UE in the connected state can switch between the normal measurement state and the measurement relaxation state, thus ensuring performance of the UE and reducing a power consumption.

Figure 12:
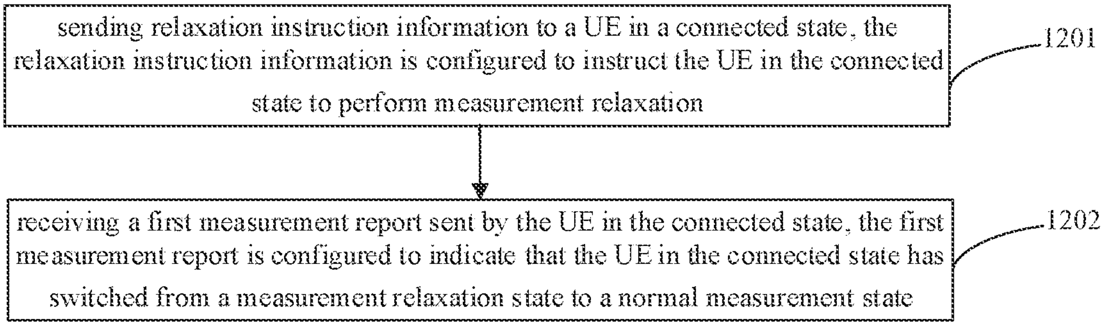
FIG. 12 is a flowchart illustrating a measurement relaxation instruction method according to another embodiment of the present disclosure.

FIG. 12 is a flowchart illustrating a measurement relaxation instruction method according to another embodiment of the present disclosure, which is applied to a base station. As shown in FIG. 12, the measurement relaxation instruction method may include the following steps.

Step 1201, relaxation instruction information is sent to a UE in a connected state. The relaxation instruction information is configured to instruct the UE in the connected state to perform measurement relaxation.

Alternatively, in an embodiment of the present disclosure, the base station may send the relaxation instruction information to the UE in the connected state in response to the third measurement report sent by the UE in the connected state. The third measurement report may be sent by the UE to the base station when determining that the UE in the connected state satisfies relaxation criteria, and the relaxation criteria include at least one of a low mobility criterion, a non-cell edge criterion, and a stationary criterion.

For detailed introduction of step 1201, reference may be made to the foregoing embodiments, which is not elaborated in the embodiment of the present disclosure.

Step 1202, a first measurement report sent by the UE in the connected state is received. The first measurement report is configured to indicate that the UE in the connected state has switched from a measurement relaxation state to a normal measurement state.

To sum up, in the measurement relaxation instruction method provided by the embodiment of the present disclosure, the base station can send the relaxation instruction information and/or the relaxation measurement configuration information to the UE in the connected state, and the UE in the connected state can switch from the normal measurement state to the measurement relaxation state based on the information sent by the base station. Therefore, the embodiment of the present disclosure proposes a measurement relaxation instruction method applied to the UE in the connected state, so that the UE in the connected state can switch between the normal measurement state and the measurement relaxation state, thus ensuring performance of the UE and reducing a power consumption.

Figure 13:
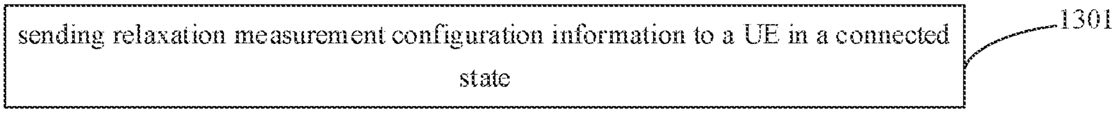
FIG. 13 is a flowchart illustrating a measurement relaxation instruction method according to another embodiment of the present disclosure.

FIG. 13 is a flowchart illustrating a measurement relaxation instruction method according to another embodiment of the present disclosure, which is applied to a base station. As shown in FIG. 13, the measurement relaxation instruction method may include the following steps.

Step 1301, relaxation measurement configuration information is sent to a UE in a connected state.

In an embodiment of the present disclosure, the base station may send the relaxation measurement configuration information to the UE in the connected state in response to a third measurement report sent by the UE in the connected state. The third measurement report may be sent by the UE to the base station when determining that the UE in the connected state satisfies relaxation criteria, and the relaxation criteria include at least one of a low mobility criterion, a non-cell edge criterion, and a stationary criterion.

In an embodiment of the present disclosure, the relaxation measurement configuration information may include at least one of the following:

a deletion indication of measurement configuration information in the normal measurement state;

a new measurement period, in which the new measurement period is longer than a measurement period in the normal measurement state;

one or more new measurement frequencies, in which a number of the one or more new measurement frequencies is less than a number of measurement frequencies in the normal measurement state, a new SMTC, in which a period of the new SMTC is greater than a period of an SMTC in the normal measurement state;

a new SMTC, in which a window length of the new SMTC is smaller than a window length of an SMTC in the normal measurement state;

a new SSB-ToMeasure parameter, in which a number of measurement beams corresponding to the new SSB-ToMeasure parameter is less than a number of measurement beams corresponding to an SSB-ToMeasure parameter in the normal measurement state; or one or more new pilot signals to be measured, in which a number of the one or more new pilot signals to be measured is less than a number of pilot signals in the normal measurement state.

In an embodiment of the present disclosure, the relaxation measurement configuration information may be only any one of the above configuration information. In another embodiment of the present disclosure, the relaxation measurement configuration information may be any combination of the above configuration information.

It should be noted that, in an embodiment of the present disclosure, if the relaxation measurement configuration information sent by the base station to the UE in the connected state includes a deletion indication of the measurement configuration information in the normal measurement state, the base station can send the original measurement configuration information (that is, the original configuration) in the normal measurement state to the UE through an RRC message (such as an RRC reconfiguration message or an RRC Resume message) within a preset time period after the base station sends the relaxation measurement configuration information, so as to ensure that the UE in the connected state can successfully switch back to the normal measurement state based on the original configuration. The preset time period may be 24 hours, for example.

For other detailed introduction about the relaxation measurement configuration information, reference may be made to the relevant introduction in the foregoing embodiments, which is not elaborated in the embodiment of the present disclosure.

To sum up, in the measurement relaxation instruction method provided by the embodiment of the present disclosure, the base station can send the relaxation instruction information and/or the relaxation measurement configuration information to the UE in the connected state, and the UE in the connected state can switch from the normal measurement state to the measurement relaxation state based on the information sent by the base station. Therefore, the embodiment of the present disclosure proposes a measurement relaxation instruction method applied to the UE in the connected state, so that the UE in the connected state can switch between the normal measurement state and the measurement relaxation state, thus ensuring performance of the UE and reducing a power consumption.

Figure 14:
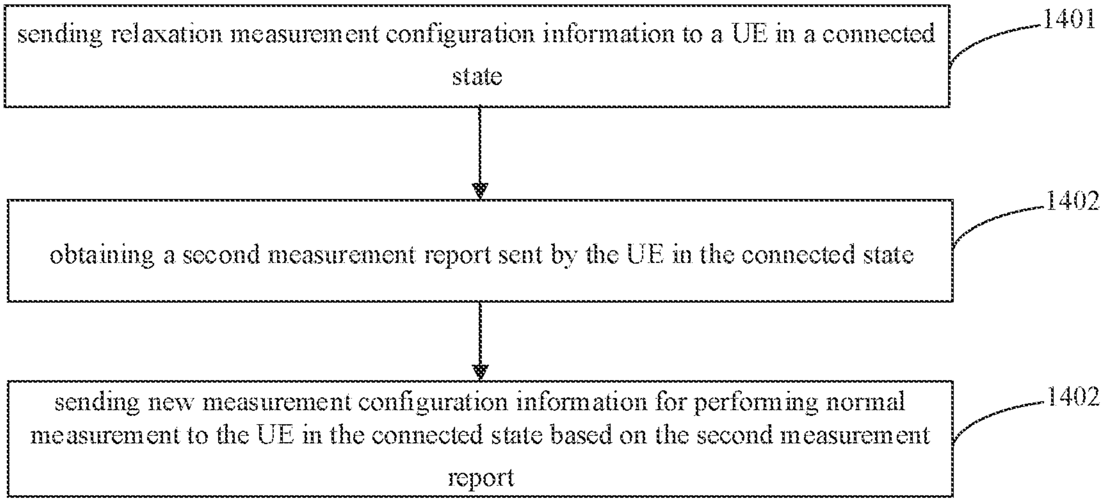
FIG. 14 is a flowchart illustrating a measurement relaxation instruction method according to another embodiment of the present disclosure.

FIG. 14 is a flowchart illustrating a measurement relaxation instruction method according to another embodiment of the present disclosure, which is applied to a base station. As shown in FIG. 14, the measurement relaxation instruction method may include the following steps.

Step 1401, relaxation measurement configuration information is sent to a UE in a connected state.

Alternatively, in an embodiment of the present disclosure, the base station may send the relaxation measurement configuration information to the UE in the connected state in response to a third measurement report sent by the UE in the connected state. The third measurement report may be sent by the UE to the base station when determining that the UE in the connected state satisfies relaxation criteria, and the relaxation criteria include at least one of a low mobility criterion, a non-cell edge criterion, and a stationary criterion.

For detailed introduction of step 1401, reference may be made to the foregoing embodiments, which is not elaborated in the embodiment of the present disclosure.

Step 1402, a second measurement report sent by the UE in the connected state is obtained.

In an embodiment of the present disclosure, the second measurement report may be configured to indicate that the UE in the connected state does not satisfy the relaxation criteria.

Step 1403, new measurement configuration information for performing normal measurement is sent to the UE in the connected state based on the second measurement report.

In an embodiment of the present disclosure, when the base station obtains the second measurement report sent by the UE in the connected state, it indicates that the UE in the connected state does not satisfy the relaxation criteria currently, and it is no longer suitable to be in the measurement relaxation state. In this case, the base station may execute step 1403, i.e., sending the new measurement configuration information for performing the normal measurement to the UE in the connected state, so that the UE in the connected state switches back to the normal measurement state.

To sum up, in the measurement relaxation instruction method provided by the embodiment of the present disclosure, the base station can send the relaxation instruction information and/or the relaxation measurement configuration information to the UE in the connected state, and the UE in the connected state can switch from the normal measurement state to the measurement relaxation state based on the information sent by the base station. Therefore, the embodiment of the present disclosure proposes a measurement relaxation instruction method applied to the UE in the connected state, so that the UE in the connected state can switch between the normal measurement state and the measurement relaxation state, thus ensuring performance of the UE and reducing a power consumption.

Figure 15:
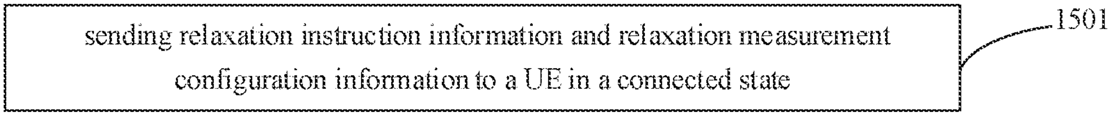
FIG. 15 is a flowchart illustrating a measurement relaxation instruction method according to another embodiment of the present disclosure.

FIG. 15 is a flowchart illustrating a measurement relaxation instruction method according to another embodiment of the present disclosure, which is applied to a base station. As shown in FIG. 15, the measurement relaxation instruction method may include the following steps.

Step 1501, relaxation instruction information and relaxation measurement configuration information are sent to a UE in a connected state.

For detailed introduction of step 1501, reference may be made to the relevant introduction in the foregoing embodiments, which is not elaborated in the embodiment of the present disclosure.

To sum up, in the measurement relaxation instruction method provided by the embodiment of the present disclosure, the base station can send the relaxation instruction information and/or the relaxation measurement configuration information to the UE in the connected state, and the UE in the connected state can switch from a normal measurement state to a measurement relaxation state based on the information sent by the base station. Therefore, the embodiment of the present disclosure proposes a measurement relaxation instruction method applied to the UE in the connected state, so that the UE in the connected state can switch between the normal measurement state and the measurement relaxation state, thus ensuring performance of the UE and reducing a power consumption.

Figure 16:
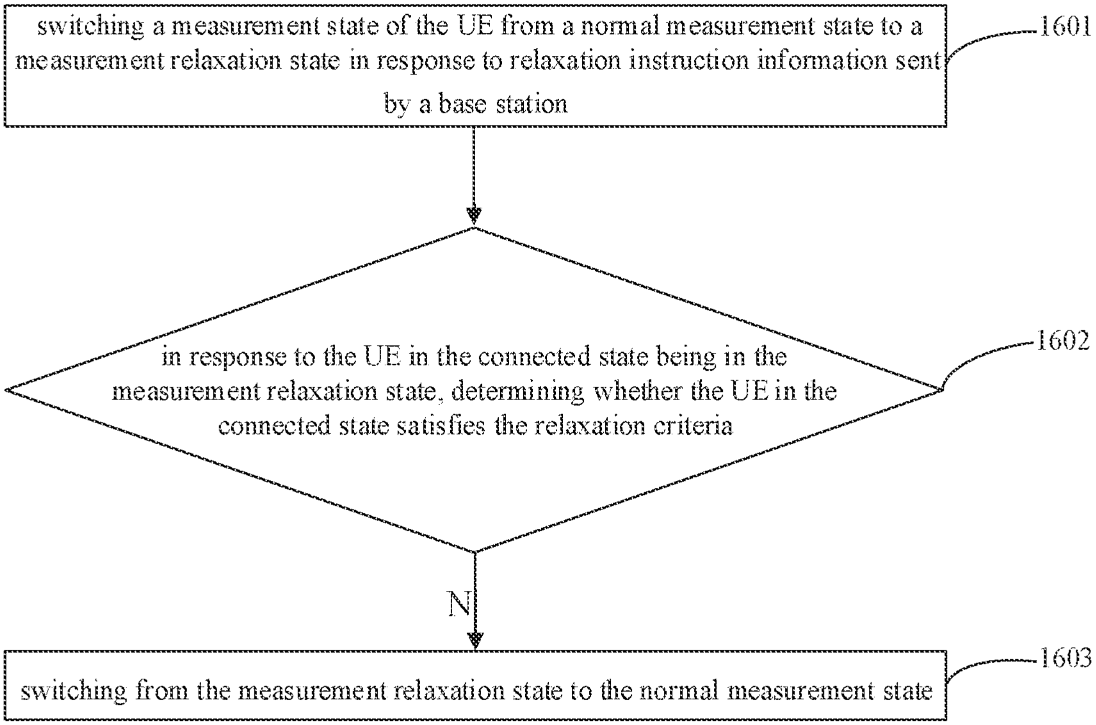
FIG. 16 is a flowchart illustrating a measurement relaxation instruction method according to another embodiment of the present disclosure.

FIG. 16 is a flowchart illustrating a measurement relaxation instruction method according to another embodiment of the present disclosure, which is applied to a UE. As shown in FIG. 16, the measurement relaxation instruction method may include the following steps.

Step 1601, a measurement state of the UE is switched from a normal measurement state to a measurement relaxation state in response to relaxation instruction information sent by a base station.

For detailed introduction of step 1601, reference may be made to the relevant introduction in the foregoing embodiments, which is not elaborated in the embodiment of the present disclosure.

Step 1602, in response to the UE in the connected state being in the measurement relaxation state, it is determined whether the UE in the connected state satisfies relaxation criteria, for example, the relaxation criteria include at least one of a low mobility criterion, a non-cell edge criterion, and a stationary criterion. When the UE in the connected state does not satisfy the relaxation criteria, step 1603 is executed.

For detailed introduction of determining whether the UE in the connected state satisfies the relaxation criteria, reference may be made to the relevant introduction in the foregoing embodiments, which is not elaborated in the embodiment of the present disclosure.

Step 1603, it is switched from the measurement relaxation state to the normal measurement state.

To sum up, in the measurement relaxation instruction method provided by the embodiment of the present disclosure, the UE in the connected state can obtain the relaxation instruction information and/or the relaxation measurement configuration information sent by the base station, and switch from the normal measurement state to the measurement relaxation state based on the information sent by the base station. Therefore, the embodiment of the present disclosure proposes a measurement relaxation instruction method applied to a UE in a connected state, so that the UE in the connected state can switch between the normal measurement state and the measurement relaxation state, thus ensuring performance of the UE and reducing a power consumption. Moreover, in the embodiment of the present disclosure, the UE sends a request to the base station to switch to the measurement relaxation state after determining that it satisfies the relaxation criteria, so as to ensure that every time the UE in the connected state switches to the measurement relaxation state when necessary, thus ensuring a switching accuracy.

Figure 17:
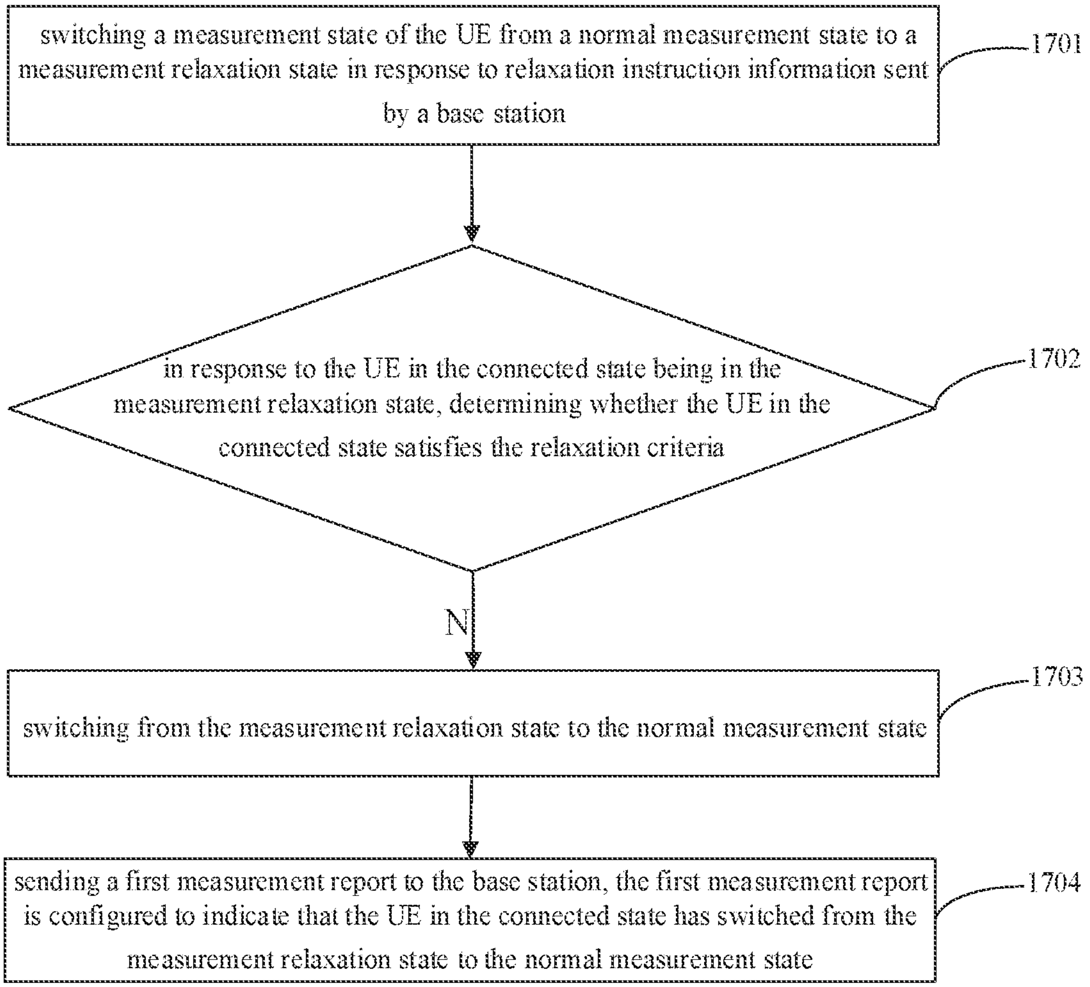
FIG. 17 is a flowchart illustrating a measurement relaxation instruction method according to another embodiment of the present disclosure.

FIG. 17 is a flowchart illustrating a measurement relaxation instruction method according to another embodiment of the present disclosure, which is applied to a UE. As shown in FIG. 17, the measurement relaxation instruction method may include the following steps.

Step 1701, a measurement state of the UE is switched from a normal measurement state to a measurement relaxation state in response to relaxation instruction information sent by a base station.

Step 1702, in response to the UE in the connected state being in the measurement relaxation state, it is determined whether the UE in the connected state satisfies relaxation criteria, for example, the relaxation criteria include at least one of a low mobility criterion, a non-cell edge criterion, and a stationary criterion. When the UE in the connected state does not satisfy the relaxation criteria, step 1703 is executed.

Step 1703, it is switched from the measurement relaxation state to the normal measurement state.

Step 1704, a first measurement report is sent to the base station. The first measurement report is configured to indicate that the UE in the connected state has switched back to the normal measurement state from the measurement relaxation state.

For detailed introduction of steps 1701-1704, reference may be made to the relevant introduction in the foregoing embodiments, which is not elaborated in the embodiment of the present disclosure.

To sum up, in the measurement relaxation instruction method provided by the embodiment of the present disclosure, the UE in the connected state can obtain the relaxation instruction information and/or the relaxation measurement configuration information sent by the base station, and switch from the normal measurement state to the measurement relaxation state based on the information sent by the base station. Therefore, the embodiment of the present disclosure proposes a measurement relaxation instruction method applied to a UE in a connected state, so that the UE in the connected state can switch between the normal measurement state and the measurement relaxation state, thus ensuring performance of the UE and reducing a power consumption. Moreover, in the embodiment of the present disclosure, the UE sends a request to the base station to switch to the measurement relaxation state after determining that it satisfies the relaxation criteria, so as to ensure that every time the UE in the connected state switches to the measurement relaxation state when necessary, thus ensuring a switching accuracy.

Figure 18:
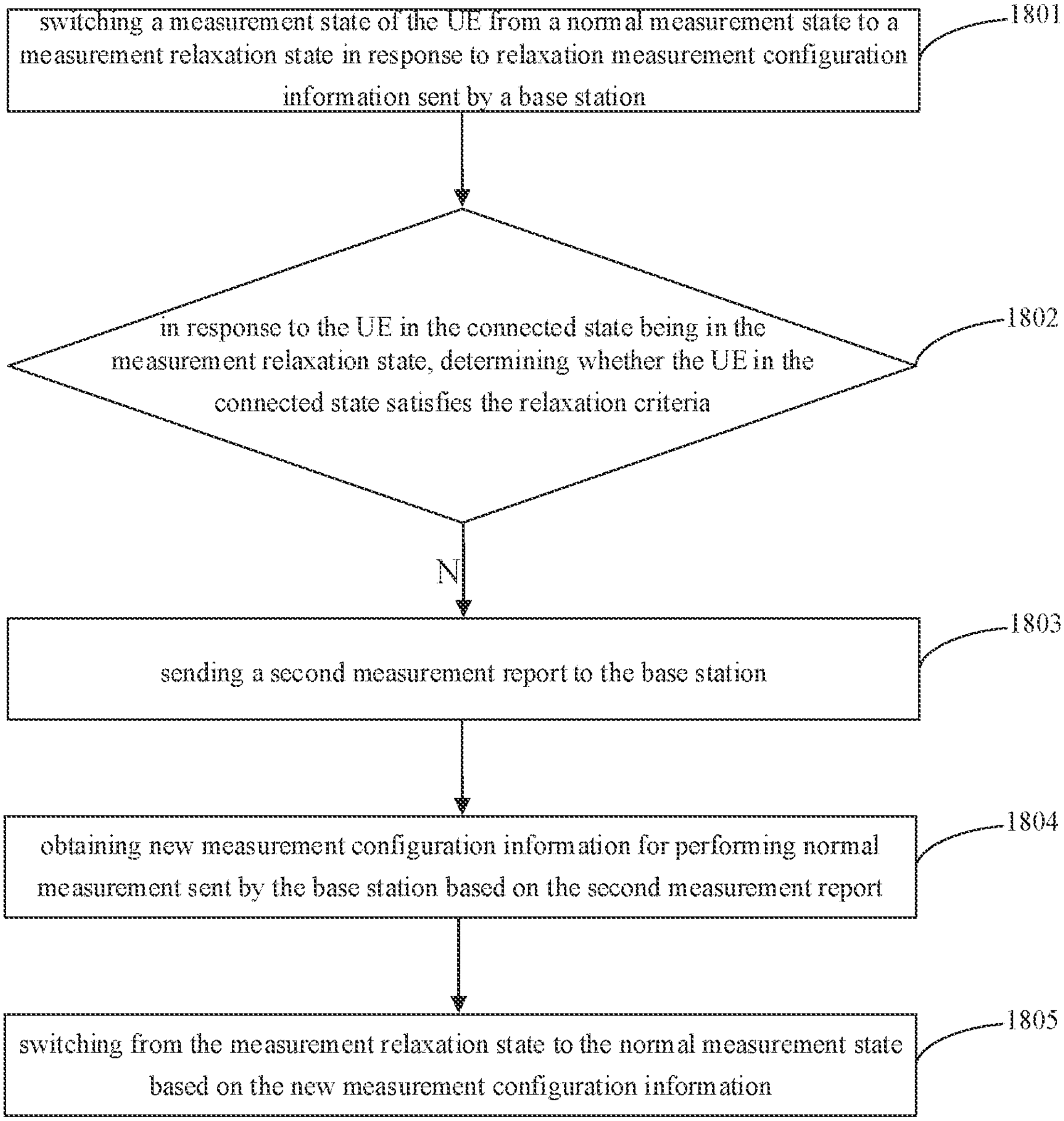
FIG. 18 is a flowchart illustrating a measurement relaxation instruction method according to another embodiment of the present disclosure.

FIG. 18 is a flowchart illustrating a measurement relaxation instruction method according to another embodiment of the present disclosure, which is applied to a UE. As shown in FIG. 18, the measurement relaxation instruction method may include the following steps.

Step 1801: a measurement state of the UE is switched from a normal measurement state to a measurement relaxation state in response to relaxation measurement configuration information sent by a base station.

Step 1802, in response to the UE in the connected state being in the measurement relaxation state, it is determined whether the UE in the connected state satisfies relaxation criteria, for example, the relaxation criteria include at least one of a low mobility criterion, a non-cell edge criterion, and a stationary criterion. When the UE in the connected state does not satisfy the relaxation criteria, step 1803 is executed.

Step 1803, a second measurement report is sent to the base station.

In an embodiment of the present disclosure, the second measurement report may be configured to indicate to the base station that the current UE in the connected state does not satisfy the relaxation criteria, so that the base station sends new measurement configuration information for performing normal measurement to the UE in the connected state based on the second measurement report.

Step 1804, the new measurement configuration information for performing the normal measurement sent by the base station based on the second measurement report is obtained.

Step 1805, it is switched from the measurement relaxation state to the normal measurement state based on the new measurement configuration information.

For detailed introduction of steps 1801-1805, reference may be made to the relevant introduction in the foregoing embodiments, which is not elaborated in the embodiment of the present disclosure.

To sum up, in the measurement relaxation instruction method provided by the embodiment of the present disclosure, the UE in the connected state can obtain the relaxation instruction information and/or the relaxation measurement configuration information sent by the base station, and switch from the normal measurement state to the measurement relaxation state based on the information sent by the base station. Therefore, the embodiment of the present disclosure proposes a measurement relaxation instruction method applied to a UE in a connected state, so that the UE in the connected state can switch between the normal measurement state and the measurement relaxation state, thus ensuring performance of the UE and reducing a power consumption. Moreover, in the embodiment of the present disclosure, the UE sends a request to the base station to switch to the measurement relaxation state after determining that it satisfies the relaxation criteria, so as to ensure that every time the UE in the connected state switches to the measurement relaxation state when necessary, thus ensuring a switching accuracy.

In combination with the above content, examples are given to illustrate the measurement relaxation instruction method in the embodiments of the present disclosure.

Example One

Step 1, the base station broadcasts the predefined measurement relaxation parameter applicable to the low mobility criterion to the UE in the connected state through the system message, in which the predefined measurement relaxation parameter includes the extension factor K of the measurement period.

Step 2, the UE in the connected state performs measurement on the serving cell, and when it is determined that the current signal quality satisfies the low mobility criterion, the UE in the connected state reports the determination result to the base station through the UL-DCCH, such as a measurement report message.

Step 3, the base station sends the measurement relaxation instruction to the UE in the connected state through the DL-DCCH, such as an RRC reconfiguration message. The measurement relaxation instruction is only configured to illustrate that the UE is allowed to perform measurement relaxation.

Step 4, the UE in the connected state receiving the measurement relaxation instruction obtains the measurement relaxation parameter (the expansion factor K of the measurement period) corresponding to the low mobility criterion broadcast in the system message.

Step 5, the UE multiplies the measurement period in the normal measurement state by the extension factor K to obtain a new measurement period, and performs RRM measurement according to the new measurement period.

Step 6, if the UE determines that the signal quality of the UE does not satisfy the low mobility criterion during the RRM measurement relaxation, the UE immediately switches to the normal measurement state, stops using the expansion factor K at the same time, that is, performing RRM measurement according to the measurement period in the normal measurement state, and reports the state that the UE does not satisfy, the measurement relaxation criteria to the base station or does not report the state that the UE does not satisfy the measurement relaxation criteria to the base station.

Example Two

Step 1, the base station directly indicates the predefined measurement relaxation parameter applicable to the stationary criterion through the TS38.331 protocol, in which the predefined measurement relaxation parameter is: the measurement suspending duration of 24 hours.

Step 2, the UE in the connected state performs measurement on the serving cell, and when it is determined that the current signal quality satisfies the stationary criterion, the UE in the connected state reports the determination result to the base station through the UL-DCCH, such as a measurement report message.

Step 3, the base station sends the measurement relaxation instruction to the UE in the connected state through the DL-DCCH, such as an RRC reconfiguration message. The measurement relaxation instruction is only configured to illustrate that the UE is allowed to perform measurement relaxation.

Step 4, the UE receiving the measurement relaxation instruction stops performing RRM measurement for up to 24 hours according to the protocol specification that satisfies the stationary criterion.

Step 5, if the UE determines that the signal quality of the UE does not satisfy the stationary criterion during the RRM measurement relaxation, the UE immediately switches to the normal measurement state, performs the RRM measurement according to the measurement configuration information in the normal measurement state at the same time, and reports the state that the UE does not satisfy the measurement relaxation criteria to the base station or does not report the state that the UE does not satisfy the measurement relaxation criteria to the base station.

Example Three

Step 1, when the UE initiates connection establishment and enters the connected state, the base station provides a set of relaxation measurement configuration information applicable to the non-cell edge criterion to the UE through an RRC message (such as RRC reconfiguration), in which the relaxation measurement configuration information may include the dedicated measurement frequency.

Step 2, the UE in the connected state performs measurement on the serving cell, and when it is determined that the current signal quality satisfies the non-cell edge criterion, the UE in the connected state reports the determination result to the base station through the UL-DCCH, such as a measurement report message.

Step 3, the base station sends the measurement relaxation instruction through the DL-DCCH (such as an RRC reconfiguration). The measurement relaxation instruction is only configured to illustrate that the UE is allowed to perform measurement relaxation.

Step 4, the UE receiving the measurement relaxation instruction performs measurement only for the measurement identifier associated with the dedicated frequency and does not perform measurement for the measurement identifiers associated with other frequencies according to the relaxation measurement configuration information corresponding to the non-cell edge criterion received through the RRC message.

Step 5, if the UE determines that the signal quality of the UE does not satisfy the non-cell edge criterion during the RRM measurement relaxation, the UE immediately switches to the normal measurement state, performs the RRM measurement according to the measurement configuration information in the normal measurement state at the same time, and reports the state that the UE does not satisfy the measurement relaxation criteria to the base station or does not report the state that the UE does not satisfy the measurement relaxation criteria to the base station.

Example Four

Step 1, the UE in the connected state performs measurement on the serving cell, and when it is determined that the current signal quality satisfies the low mobility criterion, the UE in the connected state reports the determination result to the base station through the UL-DCCH, such as a measurement report message.

Step 2, the base station sends the measurement relaxation instruction through the DL-DCCH (such as an RRC reconfiguration message). The measurement relaxation instruction carries the predefined measurement relaxation parameter. The predefined measurement relaxation parameter may include anew SMTC parameter, for example including new SMTC period/window length.

Step 3, the UE receiving the measurement relaxation parameter uses the new SMTC parameter to replace the SMTC parameter in the current measurement configuration, and calculates the measurement period according to the new SMTC parameter to perform RRM measurement.

Step 4, if the UE determines that the signal quality of the UE does not satisfy the low mobility criterion during the RRM measurement relaxation, the UE stops using the new SMTC parameter and switches to the normal measurement state, that is, performing RRM measurement according to the measurement configuration information in the normal measurement state, and reports the state that the UE does not satisfy the measurement relaxation criteria to the base station or does not report the state that the UE does not satisfy the measurement relaxation criteria to the base station.

Example Five

Step 1, the UE in the connected state performs measurement on the serving cell, and when it is determined that the current signal quality satisfies the stationary criterion, the UE in the connected state reports the determination result to the base station through the UL-DCCH, such as a measurement report message.

Step 2, the base station sends the relaxation measurement configuration information through the DL-DCCH (such as an RRC reconfiguration message). The relaxation measurement configuration information may include a deletion indication of measurement identifiers to be measured.

Step 3, after receiving the relaxation measurement configuration information, the UE deletes all measurement identifiers to be measured, and the UE does not perform measurement in this case.

Step 4, the base station sends new measurement configuration information for performing normal measurement through the DL-DCCH, such as an RRC reconfiguration message, after a preset time period (for example, 24 hours).

Step 5, if it is determined that the signal quality of the UE's current serving cell does not satisfy the stationary criterion during the relaxation, the UE reports the state to the base station, and waits for the base station to re-send the measurement configuration information for performing the normal measurement.

Figure 19:
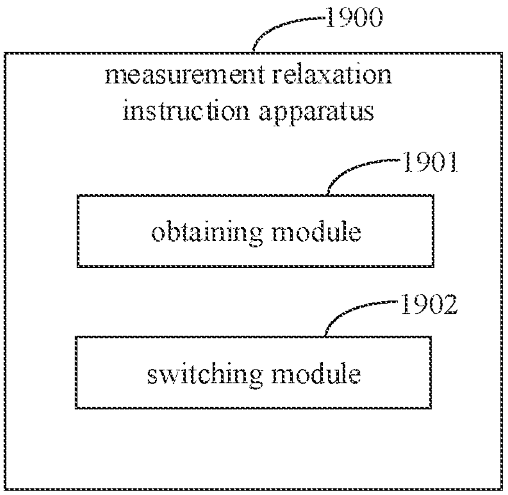
FIG. 19 is a block diagram illustrating a measurement relaxation instruction apparatus according to an embodiment of the present disclosure.

FIG. 19 is a block diagram of a measurement relaxation instruction apparatus according to an embodiment of the present disclosure. As shown in FIG. 19, the apparatus 1900 may include an obtaining module 1901 and a switching module 1902.

The obtaining module 1901 is configured to obtain relaxation instruction information and/or relaxation measurement configuration information sent by a base station.

A switching module 1902 is configured to switch from a normal measurement state to a measurement relaxation state based on information sent by the base station.

In summary, in the measurement relaxation instruction method provided by the embodiment of the present disclosure, the UE in the connected state can obtain the relaxation instruction information and/or the relaxation measurement configuration information sent by the base station, and switch from the normal measurement state to the measurement relaxation state based on the information sent by the base station. Therefore, the embodiment of the present disclosure proposes a measurement relaxation instruction method applied to a UE in a connected state, so that the UE in the connected state can switch between the normal measurement state and the measurement relaxation state, thus ensuring performance of the UE and reducing a power consumption.

In an embodiment of the present disclosure, the above-mentioned apparatus is further configured to:

determine whether the UE in the connected state satisfies relaxation criteria, in which the relaxation criteria comprise a low mobility criterion, a non-cell edge criterion, and a stationary criterion; send a third measurement report to the base station in response to the UE in the connected state satisfying the relaxation criteria; and obtain the relaxation instruction information and/or the relaxation measurement configuration information sent by the base station based on the third measurement report.

Further, in another embodiment of the present disclosure, the above-mentioned obtaining module 1901 is further configured to:

obtain the relaxation instruction information sent by the base station, in which the relaxation instruction information is configured to instruct a UE in a connected state to perform measurement relaxation.

Furthermore, in another embodiment of the present disclosure, the above-mentioned apparatus is further configured to:

obtain a predefined measurement relaxation parameter indicated by the base station.

Further, in another embodiment of the present disclosure, the above-mentioned apparatus is further configured to:

obtain the predefined measurement relaxation parameter sent by the base station through a system message;

obtain the predefined measurement relaxation parameter indicated by the base station based on a protocol; or obtain the predefined measurement relaxation parameter sent by the base station through a radio resource control (RRC) message.

Further, in another embodiment of the present disclosure, the above-mentioned obtaining module 1901 is further configured to:

obtain the relaxation instruction information sent by the base station, in which the relaxation instruction information is configured to instruct a UE in a connected state to perform measurement relaxation, and the relaxation instruction information comprises a measurement relaxation parameter.

Further, in another embodiment of the present disclosure, the above switching module 1902 is further configured to:

perform the measurement relaxation based on the measurement relaxation parameter.

Further, in another embodiment of the present disclosure, the measurement relaxation parameter includes at least one of the following:

a measurement suspending duration;

an expansion factor of a measurement period, in which the expansion factor of the measurement period is configured to lengthen a measurement period in the normal measurement state;

one or more dedicated measurement frequencies, in which a number of the one or more dedicated measurement frequencies is less than a number of measurement frequencies in the normal measurement state;

a predefined synchronization signal block measurement timing configuration (SMTC), in which a period of the predefined SMTC is greater than a period of an SMTC in the normal measurement state;

a predefined SMTC, in which a window length of the predefined SMTC is smaller than a window length of an SMTC in the normal measurement state;

a predefined synchronization signal block measurement (SSB-ToMeasure) parameter, in which a number of measurement beams corresponding to the predefined SSB-ToMeasure parameter is less than a number of measurement beams corresponding to an SSB-ToMeasure parameter in the normal measurement state; or one or more predefined types of one or more pilot signals to be measured, wherein a number of the one or more predefined types of one or more pilot signals to be measured is less than a number of types of pilot signals to be measured in the normal measurement state.

Further, in another embodiment of the present disclosure, the above-mentioned apparatus is further configured to:

determine whether the UE in the connected state satisfies relaxation criteria in response to the UE in the connected state being in the measurement relaxation state, in which the relaxation criteria include a low mobility criterion, a non-cell edge criterion, and a stationary criterion; and switch from the measurement relaxation state to the normal measurement state in response to the UE in the connected state not satisfying the relaxation criteria.

Further, in another embodiment of the present disclosure, the above-mentioned apparatus is further configured to:

send a first measurement report to the base station, in which the first measurement report is configured to indicate that the UE in the connected state has switched from the measurement relaxation state to the normal measurement state.

Further, in another embodiment of the present disclosure, the above-mentioned obtaining module 1901 is further configured to:

obtain the relaxation measurement configuration information sent by the base station.

Further, in another embodiment of the present disclosure, the relaxation measurement configuration information includes at least one of the following:

a deletion indication of measurement configuration information in the normal measurement state;

a new measurement period, in which the new measurement period is longer than a measurement period in the normal measurement state;

one or more new measurement frequencies, in which a number of the one or more new measurement frequencies is less than a number of measurement frequencies in the normal measurement state, a new SMTC, in which a period of the new SMTC is greater than a period of an SMTC in the normal measurement state;

a new SMTC, in which a window length of the new SMTC is smaller than a window length of an SMTC in the normal measurement state;

a new SSB-ToMeasure parameter, in which a number of measurement beams corresponding to the new SSB-ToMeasure parameter is less than a number of measurement beams corresponding to an SSB-ToMeasure parameter in the normal measurement state; or one or more new pilot signals to be measured, in which a number of one or more types of the one or more new pilot signals to be measured is less than a number of types of pilot signals in the normal measurement state.

Further, in another embodiment of the present disclosure, the above switching module 1902 is further configured to:

perform the measurement relaxation based on the relaxation measurement configuration information.

Further, in another embodiment of the present disclosure, the above-mentioned apparatus is further configured to:

determine whether the UE in the connected state satisfies relaxation criteria in response to the UE in the connected state being in the measurement relaxation state, in which the relaxation criteria include a low mobility criterion, a non-cell edge criterion, and a stationary criterion;

send a second measurement report to the base station in response to the UE in the connected state not satisfying the relaxation criteria;

obtain new measurement configuration information for performing normal measurement sent by the base station based on the second measurement report; and switch from the measurement relaxation state to the normal measurement state based on the new measurement configuration information.

Figure 20:
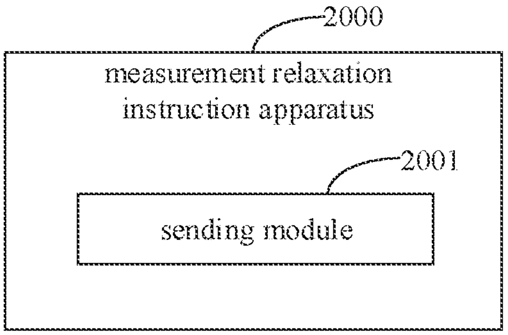
FIG. 20 is a block diagram illustrating a measurement relaxation instruction apparatus according to another embodiment of the present disclosure.

FIG. 20 is a block diagram illustrating a measurement relaxation instruction apparatus according to another embodiment of the present disclosure. As shown in FIG. 20, the apparatus 2000 may include a sending module 2001.

The sending module 2001 is configured to send relaxation instruction information and/or relaxation measurement configuration information to a user equipment (UE) in a connected state.

To sum up, in the measurement relaxation instruction method provided by the embodiment of the present disclosure, the base station can send the relaxation instruction information and/or the relaxation measurement configuration information to the UE in the connected state, and the UE in the connected state can switch from the normal measurement state to the measurement relaxation state based on the information sent by the base station. Therefore, the embodiment of the present disclosure proposes a measurement relaxation instruction method applied to the UE in the connected state, so that the UE in the connected state can switch between the normal measurement state and the measurement relaxation state, thus ensuring performance of the UE and reducing a power consumption.

In an embodiment of the present disclosure, the above-mentioned sending module 2001 is further configured to:

obtain a third measurement report sent by the UE in the connected state; and send the relaxation instruction information and/or the relaxation measurement configuration information to the UE in the connected state in response to the third measurement report.

Further, in another embodiment of the present disclosure, the above-mentioned sending module 2001 is further configured to:

send the relaxation instruction information to the UE in the connected state, in which the relaxation instruction information is configured to instruct the UE in the connected state to perform measurement relaxation.

Further, in another embodiment of the present disclosure, the above-mentioned apparatus is further configured to:

indicate a predefined measurement relaxation parameter to the UE in the connected state.

Further, in another embodiment of the present disclosure, the above-mentioned apparatus is further configured to:

send the predefined measurement relaxation parameter to the UE in the connected state through a system message;

indicate the predefined measurement relaxation parameter to the UE in the connected state through a protocol; or send the predefined measurement relaxation parameter to the UE in the connected state through a radio resource control (RRC) message.

Further, in another embodiment of the present disclosure, the above-mentioned sending module 2001 is further configured to:

send the relaxation instruction information to the UE in the connected state, in which the relaxation instruction information is configured to instruct the UE in the connected state to perform measurement relaxation, and the relaxation instruction information includes a measurement relaxation parameter.

Further, in another embodiment of the present disclosure, the measurement relaxation parameter includes at least one of the following:

a measurement suspending duration;

an expansion factor of a measurement period, in which the expansion factor of the measurement period is configured to lengthen the measurement period in the normal measurement state;

one or more dedicated measurement frequencies, in which a number of the one or more dedicated measurement frequencies is less than a number of measurement frequencies in the normal measurement state;

a new synchronization signal block measurement timing configuration (SMTC), in which a period of the new SMTC is greater than a period of an SMTC in the normal measurement state;

a new SMTC, in which a window length of the new SMTC is smaller than a window length of an SMTC in the normal measurement state;

a new synchronization signal block measurement (SSB-ToMeasure) parameter, in which a number of measurement beams corresponding to the new SSB-ToMeasure parameter is less than a number of measurement beams corresponding to an SSB-ToMeasure parameter in the normal measurement state; or a reduction indication of one or more pilot signals to be measured.

Further, in another embodiment of the present disclosure, the above-mentioned apparatus is further configured to:

receive a first measurement report sent by the UE in the connected state, in which the first measurement report is configured to indicate that the UE in the connected state has switched from the measurement relaxation state to the normal measurement state.

Further, in another embodiment of the present disclosure, the above-mentioned sending module 2001 is further configured to:

send the relaxation measurement configuration information to the UE in the connected state.

Further, in another embodiment of the present disclosure, the relaxation measurement configuration information includes at least one of the following:

a deletion indication of measurement configuration information in the normal measurement state;

a new measurement period, in which the new measurement period is longer than a measurement period in the normal measurement state;

one or more new measurement frequencies, in which a number of the one or more new measurement frequencies is less than a number of measurement frequencies in the normal measurement state;

a new SMTC, in which a period of the new SMTC is greater than a period of an SMTC in the normal measurement state;

a new SMTC, in which a window length of the new SMTC is smaller than a window length of an SMTC in the normal measurement state;

a new SSB-ToMeasure parameter, in which a number of measurement beams corresponding to the new SSB-ToMeasure parameter is less than a number of measurement beams corresponding to an SSB-ToMeasure parameter in the normal measurement state; or one or more new pilot signals to be measured, in which a number of the one or more new pilot signals to be measured is less than a number of pilot signals in the normal measurement state.

Further, in another embodiment of the present disclosure, the above-mentioned apparatus is further configured to:

obtain a second measurement report sent by the UE in the connected state, and send new measurement configuration information for performing normal measurement to the UE in the connected state based on the second measurement report The computer storage medium provided by the embodiments of the present disclosure stores an executable program. After the executable program is executed by a processor, any method shown in FIG. 1-FIG. 8 or in FIG. 9-FIG. 15 or in FIG. 16-FIG. 18 is implemented.

In order to implement the above-mentioned embodiments, the present disclosure also proposes a computer program product, including a computer program. When the computer program is executed by a processor, any method shown in FIG. 1-FIG. 8 or in FIG. 9-FIG. 15 or in FIG. 16-FIG. 18 is implemented.

In addition, in order to implement the above-mentioned embodiments, the present disclosure also proposes a computer program. When the program is executed by a processor, any method shown in FIG. 1-FIG. 8 or in FIG. 9-FIG. 15 or in FIG. 16-FIG. 18 is implemented.

Figure 21:
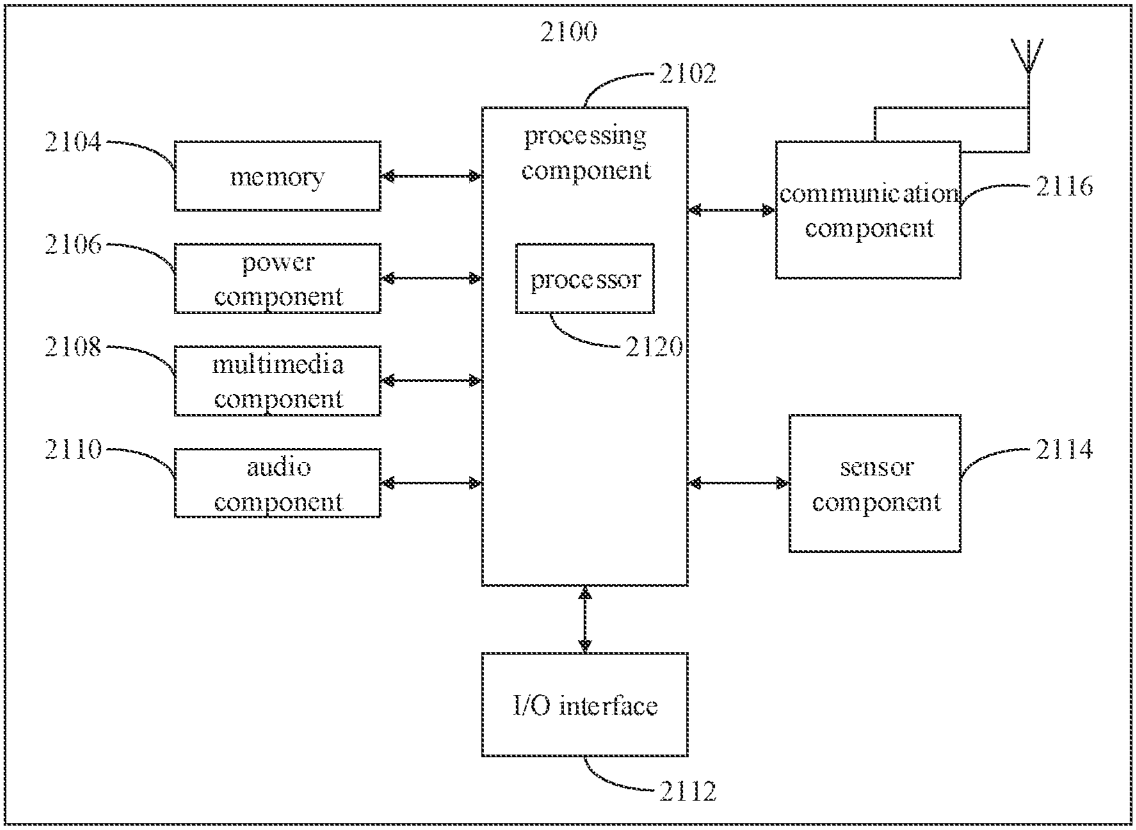
FIG. 21 is a block diagram of a user equipment according to an embodiment of the present disclosure.

FIG. 21 is a block diagram illustrating a UE 2100 for cell reselection configuration or information transmission according to an embodiment. For example, the UE 2100 may be a mobile phone, a computer, a digital broadcast user device, a messaging sending and receiving equipment, a game console, a tablet, a medical device, a fitness device, a personal digital assistant, or the like.

As illustrated in FIG. 21, the UE 2100 may include one or more of: a processing component 2102, a memory 2104, a power component 2106, a multimedia component 2108, an audio component 2110, an input/output (I/O) interface 2112, a sensor component 2114, and a communication component 2116.

The processing component 2102 typically controls overall operations of the UE 2100, such as the operations associated with display, telephone calls, data communications, camera operations, and recording operations. The processing component 2102 may include one or more processors 2120 to execute instructions to perform all or part of the steps in the above-described methods. Moreover, the processing component 2102 may include one or more modules which facilitate the interaction between the processing component 2102 and other components. For example, the processing component 2102 may include a multimedia module to facilitate the interaction between the multimedia component 2108 and the processing component 2102.

The memory 2104 is configured to store various types of data to support the operation of the UE 2100. Examples of such data include instructions for any applications or methods operated on the UE 2100, contraction data, phonebook data, messages, pictures, video, etc. The memory 2104 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 2106 is configured to provide power to various components of the UE 2100. The power component 2106 may include a power management system, one or more power sources, and any other components associated with the generation, management, and distribution of power in the UE 2100.

The multimedia component 2108 includes a screen providing an output interface between the UE 2100 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 2108 includes a front camera and/or a rear camera. The front camera and the rear camera may receive an external multimedia datum while the UE 2100 is in an operation mode, such as a photographing mode or a video mode. Each of the front camera and the rear camera may be a fixed optical lens system or have focus and optical zoom capability.

The audio component 2110 is configured to output and/or input audio signals. For example, the audio component 2110 includes a microphone ("MIC") for receiving an external audio signal when the UE 2100 is in an operation mode, such as a call mode, a recording mode, and a speech recognition mode. The received audio signal may be further stored in the memory 2104 or transmitted via the communication component 2116. In some embodiments, the audio component 2110 further includes a speaker to output audio signals.

The I/O interface 2112 is configured to provide an interface between the processing component 2102 and peripheral interface modules, such as a keyboard, a click wheel, buttons, and the like. The buttons may include, but be not limited to, a home button, a volume button, a starting button, and a locking button.

The sensor component 2114 includes one or more sensors for providing status assessments of various aspects of the UE 2100. For example, the sensor component 2114 may detect an open/closed status of the UE 2100, relative positioning of components, e.g., the display and the keypad of the UE 2100, a change in position of the UE 2100 or a component of the UE 2100, a presence or absence of user contraction with the UE 2100, an orientation or an acceleration/deceleration of the UE 2100, and a change in temperature of the UE 2100. The sensor component 2114 may include a proximity sensor for detecting the presence of nearby objects without any physical contact. The sensor component 2114 may also include a light sensor, such as a CMOS (complementary metal-oxide-semiconductor)) or a CCD (charge coupled device) image sensor, for use in imaging applications. In some embodiments, the sensor component 2114 may also include an accelerometer sensor, a gyroscope sensor, a magnetic sensor, a pressure sensor, or a temperature sensor.

The communication component 2116 is configured to facilitate communication, wired or wirelessly, between the UE 2100 and other devices. The UE 2100 may access a wireless network based on a communication standard, such as Wi-Fi, 2G, or 3G, or a combination thereof. In an exemplary embodiment, the communication component 2116 receives a broadcast signal or broadcast associated information from an external broadcast management system via a broadcast channel. In an exemplary embodiment, the communication component 2116 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In an exemplary embodiment, the UE 2100 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing any of the above methods.

Figure 22:
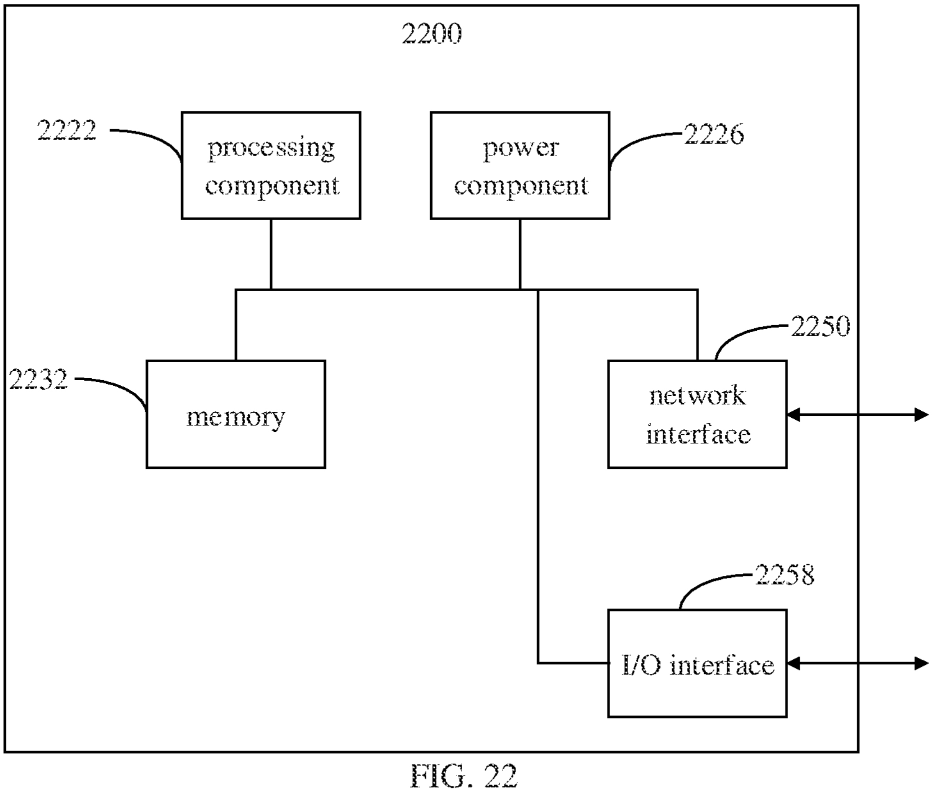
FIG. 22 is a block diagram of a base station according to an embodiment of the present disclosure.

As illustrated in FIG. 22, an embodiment of the disclosure illustrates a block diagram of a base station. For example, the base station 2200 may be provided as a network-side device. Referring to FIG. 22, the base station 2200 includes a processing component 2222, further including one or more processors, and memory resources represented by a memory 2232 for storing instructions, such as application programs, executable by the processing component 2222. The application program stored in the memory 2232 may include one or more modules each corresponding to a set of instructions. In addition, the processing component 2222 is configured to execute instructions to execute any of the above method applied to the base station, such the method illustrated in any of FIG. 9-FIG. 15.

The base station 2200 may also include a power component 2226 configured to perform power management of the base station 2200, a wired or wireless network interface 2250 configured to connect the base station 2200 to a network, and an input/output (I/O) interface 2258. The base station 2200 may operate an operating system stored in the memory 2232, such as a Windows Server™, a Mac OS X™, a Unix™, a Linux™, a FreeBSD™ or the like.

Other implementations of the disclosure may be apparent to the skilled in the art from consideration of the specification and practice of the disclosure disclosed here. This disclosure is intended to cover any variations, uses, or adaptations of the disclosure following the general principles thereof and including such departures from the disclosure as come within known or customary practice in the art. It is intended that the specification and examples be considered as exemplary only, with a true scope and spirit of the disclosure being indicated by the following claims.

It should be understood that the disclosure is not limited to the exaction construction that has been described above and illustrated in the accompanying drawings, and that various modifications and changes may be made without departing from the scope thereof. The scope of the disclosure only is limited by the appended claims.

The invention claimed is:

1. A measurement relaxation instruction method, performed by a user equipment (UE), comprising:

determining whether the UE in a connected state satisfies relaxation criteria, wherein the relaxation criteria comprise at least one of a low mobility criterion, a non-cell edge criterion, or a stationary criterion;

sending a third measurement report to a base station in response to the UE in the connected state satisfying the relaxation criteria, wherein the third measurement report is configured to indicate that the UE in the connected state satisfies the relaxation criteria;

obtaining at least one of relaxation instruction information or relaxation measurement configuration information sent by the base station based on the third measurement report; and switching from a normal measurement state to a measurement relaxation state based on the at least one of the relaxation instruction information or the relaxation measurement configuration information sent by the base station.

2. The method of claim 1, wherein obtaining the at least one of the relaxation instruction information or the relaxation measurement configuration information sent by the base station comprises:

obtaining the relaxation instruction information sent by the base station, wherein the relaxation instruction information is configured to instruct the UE in the connected state to perform measurement relaxation.

3. The method of claim 2, further comprising obtaining a predefined measurement relaxation parameter indicated by the base station, wherein obtaining the predefined measurement relaxation parameter indicated by the base station comprises at least one of:

obtaining the predefined measurement relaxation parameter sent by the base station through a system message;

obtaining the predefined measurement relaxation parameter indicated by the base station based on a protocol; or obtaining the predefined measurement relaxation parameter sent by the base station through a radio resource control (RRC) message.

4. The method of claim 3, wherein switching from the normal measurement state to the measurement relaxation state based on the at least one of the relaxation instruction information or the relaxation measurement configuration information sent by the base station comprises:

performing the measurement relaxation based on the measurement relaxation parameter, wherein the measurement relaxation parameter comprises at least one of:

a measurement suspending duration;

an expansion factor of a measurement period, wherein the expansion factor of the measurement period is configured to lengthen the measurement period in the normal measurement state;

one or more dedicated measurement frequencies, wherein a number of the one or more dedicated measurement frequencies is less than a number of measurement frequencies in the normal measurement state;

a predefined synchronization signal block measurement timing configuration (SMTC), wherein a period of the predefined SMTC is greater than a period of an SMTC in the normal measurement state;

a predefined SMTC, wherein a window length of the predefined SMTC is smaller than a window length of an SMTC in the normal measurement state;

a predefined synchronization signal block measurement (SSB-ToMeasure) parameter, wherein a number of measurement beams corresponding to the predefined SSB-ToMeasure parameter is less than a number of measurement beams corresponding to an SSB-ToMeasure parameter in the normal measurement state; or one or more predefined types of one or more pilot signals to be measured, wherein a number of the one or more predefined types of one or more pilot signals to be measured is less than a number of types of pilot signals to be measured in the normal measurement state;

wherein the predefined measurement relaxation parameter comprises a different parameter depending on which of the relaxation criteria the UE in the connected state satisfies;

wherein the measurement period in the normal measurement state is determined based on the period of the SMTC in the normal measurement state, or the measurement period in the normal measurement state is determined based on a discontinuous reception and a measurement gap repetition period.

5. The method of claim 4, wherein the predefined measurement relaxation parameter comprises the measurement suspending duration in a case of the UE in the connected state satisfying the stationary criterion;

wherein the predefined measurement relaxation parameter comprises the expansion factor of the measurement period in a case of the UE in the connected state satisfying the low mobility criterion;

wherein the predefined measurement relaxation parameter comprises the one or more dedicated measurement frequencies in a case of the UE in the connected state satisfying the non-cell edge criterion.

6. The method of claim 2, further comprising:

determining whether the UE in the connected state satisfies the relaxation criteria, wherein the UE in the connected state is in the measurement relaxation state; and switching from the measurement relaxation state to the normal measurement state in response to the UE in the connected state not satisfying the relaxation criteria.

7. The method of claim 6, further comprising:

sending a first measurement report to the base station, wherein the first measurement report is configured to indicate that the UE in the connected state has switched from the measurement relaxation state back to the normal measurement state.

8. The method of claim 1, wherein obtaining the at least one of the relaxation instruction information or the relaxation measurement configuration information sent by the base station comprises:

obtaining the relaxation instruction information sent by the base station, wherein the relaxation instruction information is configured to instruct the UE in the connected state to perform measurement relaxation, and the relaxation instruction information comprises a measurement relaxation parameter.

9. The method of claim 1, wherein obtaining the at least one of the relaxation instruction information or the relaxation measurement configuration information sent by the base station comprises:

obtaining the relaxation measurement configuration information sent by the base station; wherein the relaxation measurement configuration information comprises at least one of:

a deletion indication of measurement configuration information in the normal measurement state;

a new measurement period, wherein the new measurement period is longer than a measurement period in the normal measurement state;

one or more new measurement frequencies, wherein a number of the one or more new measurement frequencies is less than a number of measurement frequencies in the normal measurement state;

a new SMTC, wherein a period of the new SMTC is greater than a period of an SMTC in the normal measurement state;

a new SMTC, wherein a window length of the new SMTC is smaller than a window length of an SMTC in the normal measurement state;

a new SSB-ToMeasure parameter, wherein a number of measurement beams corresponding to the new SSB-ToMeasure parameter is less than a number of measurement beams corresponding to an SSB-ToMeasure parameter in the normal measurement state; or one or more new pilot signals to be measured, wherein a number of one or more types of the one or more new pilot signals to be measured is less than a number of types of pilot signals in the normal measurement state;

wherein the relaxation measurement configuration information comprises different information depending on which of the relaxation criteria the UE in the connected state satisfies.

10. The method of claim 9, wherein switching from the normal measurement state to the measurement relaxation state based on the at least one of the relaxation instruction information or the relaxation measurement configuration information sent by the base station comprises:

performing the measurement relaxation based on the relaxation measurement configuration information;

wherein the relaxation measurement configuration information comprises the deletion indication of measurement configuration information in the normal measurement state in a case of the UE in the connected state satisfying the stationary criterion;

wherein the relaxation measurement configuration information comprises an expansion factor of the measurement period in a case of the UE in the connected state satisfying the low mobility criterion;

wherein the relaxation measurement configuration information comprises one or more dedicated measurement frequencies in a case of the UE in the connected state satisfying the non-cell edge criterion.

11. The method of claim 9, further comprising:

determining whether the UE in the connected state satisfies the relaxation criteria, wherein the UE in the connected state is in the measurement relaxation state;

sending a second measurement report to the base station in response to the UE in the connected state not satisfying the relaxation criteria;

obtaining new measurement configuration information for performing normal measurement sent by the base station based on the second measurement report; and switching from the measurement relaxation state to the normal measurement state based on the new measurement configuration information.

12. A measurement relaxation instruction method, performed by a base station, comprising:

sending at least one of relaxation instruction information or relaxation measurement configuration information to a user equipment (UE) in a connected state;

wherein sending the at least one of the relaxation instruction information or the relaxation measurement configuration information to the UE in the connected state comprises:

obtaining a third measurement report sent by the UE in the connected state, wherein the third measurement report is configured to indicate that the UE in the connected state satisfies relaxation criteria, wherein the relaxation criteria comprise at least one of a low mobility criterion, a non-cell edge criterion, or a stationary criterion; and sending the at least one of the relaxation instruction information or the relaxation measurement configuration information to the UE in the connected state based on the third measurement report.

13. The method of claim 12, wherein sending the at least one of the relaxation instruction information or the relaxation measurement configuration information to the UE in the connected state comprises:

sending the relaxation instruction information to the UE in the connected state, wherein the relaxation instruction information is configured to instruct the UE in the connected state to perform measurement relaxation.

14. The method of claim 13, further comprising:

indicating a predefined measurement relaxation parameter to the UE in the connected state;

wherein indicating the predefined measurement relaxation parameter to the UE in the connected state comprises at least one of:

sending the predefined measurement relaxation parameter to the UE in the connected state through a system message;

indicating the predefined measurement relaxation parameter to the UE in the connected state through a protocol; or sending the predefined measurement relaxation parameter to the UE in the connected state through a radio resource control (RRC) message.

15. The method of claim 14, wherein the measurement relaxation parameter comprises at least one of:

a measurement suspending duration;

an expansion factor of a measurement period, wherein the expansion factor of the measurement period is configured to lengthen the measurement period in a normal measurement state;

one or more dedicated measurement frequencies, wherein a number of the one or more dedicated measurement frequencies is less than a number of measurement frequencies in the normal measurement state;

a new synchronization signal block measurement timing configuration (SMTC), wherein a period of the new SMTC is greater than a period of an SMTC in the normal measurement state;

a new SMTC, wherein a window length of the new SMTC is smaller than a window length of an SMTC in the normal measurement state;

a new synchronization signal block measurement (SSB-ToMeasure) parameter, wherein a number of measurement beams corresponding to the new SSB-ToMeasure parameter is less than a number of measurement beams corresponding to an SSB-ToMeasure parameter in the normal measurement state; or a reduction indication of one or more pilot signals to be measured;

wherein the predefined measurement relaxation parameter comprises a different parameter depending on which of the relaxation criteria the UE in the connected state satisfies;

wherein the measurement period in the normal measurement state is determined based on the period of the SMTC in the normal measurement state, or the measurement period in the normal measurement state is determined based on a discontinuous reception and a measurement gap repetition period.

16. The method of claim 15, wherein the predefined measurement relaxation parameter comprises the measurement suspending duration in a case of the UE in the connected state satisfying the stationary criterion;

wherein the predefined measurement relaxation parameter comprises the expansion factor of the measurement period in a case of the UE in the connected state satisfying the low mobility criterion;

wherein the predefined measurement relaxation parameter comprises the one or more dedicated measurement frequencies in a case of the UE in the connected state satisfying the non-cell edge criterion.

17. The method of claim 13, further comprising:

receiving a first measurement report sent by the UE in the connected state, wherein the first measurement report is configured to indicate that the UE in the connected state has switched from a measurement relaxation state to the normal measurement state.

18. The method of claim 12, wherein sending the at least one of the relaxation instruction information or the relaxation measurement configuration information to the UE in the connected state comprises:

sending the relaxation instruction information to the UE in the connected state, wherein the relaxation instruction information is configured to instruct the UE in the connected state to perform measurement relaxation, and the relaxation instruction information comprises a measurement relaxation parameter.

19. The method of claim 12, wherein sending the at least one of the relaxation instruction information or the relaxation measurement configuration information to the UE in the connected state comprises:

sending the relaxation measurement configuration information to the UE in the connected state; wherein the relaxation measurement configuration information comprises at least one of:

a deletion indication of measurement configuration information in the normal measurement state;

a new measurement period, wherein the new measurement period is longer than a measurement period in the normal measurement state;

one or more new measurement frequencies, wherein a number of the one or more new measurement frequencies is less than a number of measurement frequencies in the normal measurement state;

a new SMTC, wherein a period of the new SMTC is greater than a period of an SMTC in the normal measurement state;

a new SMTC, wherein a window length of the new SMTC is smaller than a window length of an SMTC in the normal measurement state;

a new SSB-ToMeasure parameter, wherein a number of measurement beams corresponding to the new SSB-ToMeasure parameter is less than a number of measurement beams corresponding to an SSB-ToMeasure parameter in the normal measurement state; or one or more new pilot signals to be measured, wherein a number of the one or more new pilot signals to be measured is less than a number of pilot signals in the normal measurement state;

wherein the relaxation measurement configuration information comprises different information depending on which of the relaxation criteria the UE in the connected state satisfies.

20. The method of claim 19, further comprising:

obtaining a second measurement report sent by the UE in the connected state; and sending new measurement configuration information for performing normal measurement to the UE in the connected state based on the second measurement report.

* * * * *